US009105229B2

(12) United States Patent
Goto

(10) Patent No.: US 9,105,229 B2
(45) Date of Patent: Aug. 11, 2015

(54) DISPLAY APPARATUS HAVING LUMINANCE REDUCTION CONTROLLER

(75) Inventor: Ryo Goto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1406 days.

(21) Appl. No.: 12/095,301

(22) PCT Filed: Nov. 28, 2006

(86) PCT No.: PCT/JP2006/323675

§ 371 (c)(1),
(2), (4) Date: Jun. 22, 2009

(87) PCT Pub. No.: WO2007/063830

PCT Pub. Date: Jun. 7, 2007

(65) Prior Publication Data

US 2010/0026724 A1 Feb. 4, 2010

(30) Foreign Application Priority Data

Nov. 29, 2005 (JP) ................................ 2005-343844
Nov. 29, 2005 (JP) ................................ 2005-343845

(51) Int. Cl.

| | |
|---|---|
| ***G09G 5/10*** | (2006.01) |
| ***G09G 3/30*** | (2006.01) |
| ***G06F 1/26*** | (2006.01) |
| ***G06F 1/30*** | (2006.01) |
| ***G06F 1/32*** | (2006.01) |
| ***G09G 3/32*** | (2006.01) |
| ***G09G 3/20*** | (2006.01) |
| *G09G 3/18* | (2006.01) |

(52) U.S. Cl.
CPC ................ *G09G 3/3208* (2013.01); *G09G 3/20* (2013.01); *G09G 3/18* (2013.01); *G09G 2330/021* (2013.01); *G09G 2330/04* (2013.01)

(58) Field of Classification Search
CPC ........................................................ G09G 5/10
See application file for complete search history.

(56) References Cited

U.S. PATENT DOCUMENTS

| | | | | |
|---|---|---|---|---|
| 5,564,004 A | 10/1996 | Grossman et al. | ............ | 395/159 |
| 5,598,565 A * | 1/1997 | Reinhardt | ...................... | 713/323 |
| 5,740,390 A | 4/1998 | Pickover et al. | .............. | 395/348 |
| 5,745,715 A | 4/1998 | Pickover et al. | .............. | 395/348 |
| 5,760,774 A | 6/1998 | Grossman et al. | ............ | 345/348 |
| 5,852,440 A | 12/1998 | Grossman et al. | ............ | 345/348 |
| 6,738,055 B1 * | 5/2004 | Abe et al. | ....................... | 345/211 |

(Continued)

FOREIGN PATENT DOCUMENTS

| | | |
|---|---|---|
| JP | 04-295887 | 10/1992 |
| JP | 07-281864 | 10/1995 |

(Continued)

OTHER PUBLICATIONS

Japanese language office action dated Mar. 29, 2011 and its English language translation for corresponding Japanese application 2005343844.

(Continued)

*Primary Examiner* — Joseph Feild
*Assistant Examiner* — K. Kiyabu
(74) *Attorney, Agent, or Firm* — Studebaker & Brackett PC

(57) ABSTRACT

A display apparatus comprises: a display unit in which each pixel is formed from a self-luminous element, and a controller that reduces a luminance of a pixel which has not changed for a predetermined period of time or more.

8 Claims, 26 Drawing Sheets

(56) References Cited

U.S. PATENT DOCUMENTS

| | | | | |
|---|---|---|---|---|
| 7,036,025 | B2 * | 4/2006 | Hunter | 713/300 |
| 2003/0210256 | A1 | 11/2003 | Mori et al. | 345/690 |
| 2005/0275651 | A1 * | 12/2005 | Plut | 345/211 |
| 2006/0087502 | A1 * | 4/2006 | Karidis et al. | 345/211 |
| 2006/0132474 | A1 * | 6/2006 | Lam | 345/204 |
| 2007/0002035 | A1 * | 1/2007 | Plut | 345/211 |

FOREIGN PATENT DOCUMENTS

| | | |
|---|---|---|
| JP | 2001-013914 | 1/2001 |
| JP | 2002-268601 | 9/2002 |
| JP | 2003-271106 | 9/2003 |
| JP | 2003-280592 | 10/2003 |
| JP | 2003-308041 | 10/2003 |
| JP | 2004-177720 | 6/2004 |
| JP | 2005-210707 | 8/2005 |

OTHER PUBLICATIONS

Japanese language office action dated Mar. 29, 2011 and its English language translation for corresponding Japanese application 2005343845.

* cited by examiner

FIG. 10A 32 34 35 33 31 36

| REGION | WEIGHTING | MAIN REGION | SUB-REGION | THRESHOLD (NUMBER) | TIME (SECS.) | LUMINANCE (%) | EVENT COOPERATION |
|---|---|---|---|---|---|---|---|
| A | LOW | NONE | B, C, D, E, I, J, K | 40 | 10 | 100 | NONE |
| B | LOW | A | NONE | 40 | 10 | 100 | NONE |
| C | HIGH | A | NONE | 1 | 30 | 100 | NONE |
| D | LOW | A | NONE | 40 | 10 | 100 | NONE |
| E | LOW | A | NONE | 40 | 10 | 100 | NONE |
| F | LOW | NONE | NONE | 40 | 10 | 100 | MAIL RECEIVED |
| G | LOW | NONE | NONE | 40 | 10 | 100 | NONE |
| H | HIGH | NONE | NONE | 1 | 30 | 100 | NONE |
| I | LOW | A | NONE | 40 | 10 | 100 | NONE |
| J | LOW | A | NONE | 40 | 10 | 100 | NONE |
| K | LOW | A | NONE | 40 | 10 | 100 | NONE |

FIG. 10B 32 34 35 33 31 36

| REGION | WEIGHTING | MAIN REGION | SUB-REGION | THRESHOLD (NUMBER) | TIME (SECS.) | LUMINANCE (%) | EVENT COOPERATION |
|---|---|---|---|---|---|---|---|
| A | HIGH | NONE | C, D, G, H, I | 1 | 30 | 100 | NONE |
| B | LOW | NONE | NONE | 40 | 10 | 100 | NONE |
| C | HIGH | A | NONE | 1 | 30 | 100 | NONE |
| D | LOW | A | NONE | 40 | 10 | 100 | NONE |
| E | LOW | NONE | NONE | 40 | 10 | 100 | NONE |
| F | LOW | NONE | NONE | 1 | 10 | 100 | MAIL RECEIVED |
| G | LOW | A | NONE | 40 | 10 | 100 | NONE |
| H | LOW | A | NONE | 40 | 10 | 100 | NONE |
| I | LOW | A | NONE | 40 | 10 | 100 | NONE |

FIG. 10C

| REGION | MAIN REGION | SUB-REGION |
|---|---|---|
| E1 | NONE | E2 |
| E2 | E1 | NONE |

DISPLAY APPARATUS HAVING LUMINANCE REDUCTION CONTROLLER

TECHNICAL FIELD

The present invention relates to a display apparatus in which a pixel is formed from a self-luminous element.

Priority is claimed on Japanese Patent Application No. 2005-343844 filed on Nov. 29, 2005, and Japanese Patent Application No. 2005-343845 filed on Nov. 29, 2005, the contents of which are incorporated herein by reference.

Recently, a display apparatus in which the pixel is formed from an organic EL (electro-luminescence) element, that is, an organic EL display has been developed. The organic EL display has an advantage in that the angle of visibility is wide and a thin display can be realized, as compared with a liquid crystal display. However, it has a disadvantage in that large amounts of power are consumed. Therefore, when it is applied to a portable terminal device, the power of the battery is consumed very quickly, thereby decreasing operable time. Accordingly, a technology for reducing power consumption is required.

As a technology for reducing power consumption of the display apparatus, for example, there is the technology disclosed in Japanese Unexamined Patent Application, First Publication No. 2003-271106 and the technology disclosed in Japanese Unexamined Patent Application, First Publication No. 2005-210707.

These technologies decrease luminance of a back light of a liquid crystal display under certain conditions, to thereby reduce the power consumption. The certain conditions are in Japanese Unexamined Patent Application, First Publication No. 2003-271106, when a specific still image such as a color bar is being displayed, and in Japanese Unexamined Patent Application, First Publication No. 2005-210707, when a commercial message or the like is being displayed.

Moreover, the technology disclosed in Japanese Unexamined Patent Application, First Publication No. 2002-268601 reduces the luminance of pixels constituting a display unit of the display apparatus, when a state in which there is no input operation of a user continues for a predetermined period of time.

DISCLOSURE OF INVENTION

Problems to be Solved by the Invention

In the organic EL display, if the technologies disclosed in Japanese Unexamined Patent Application, First Publication No. 2003-271106 or 2005-210707 are used to reduce the power consumption, then when an image other than a specific still image or a specific image such as a commercial message is displayed, the power consumption cannot be reduced. There is a time at which and a part in which the luminance can be reduced without any problem, even when an image other than the specific image is displayed. Therefore, it cannot be said that reduction of the power consumption is sufficient according to the technologies disclosed in Japanese Unexamined Patent Application, First Publication No. 2003-271106 or 2005-210707. Furthermore this situation is not limited to the organic EL display, and also occurs with other display apparatuses in which the pixel is formed from the self-luminous element. Therefore, there is room for a reduction of the power consumption in these display apparatuses.

Moreover, according to the technology disclosed in Japanese Unexamined Patent Application, First Publication No. 2002-268601, the power consumption cannot be reduced while the operation of the user continues. Therefore, it cannot be said that reduction of the power consumption is sufficient, and there is still room for a reduction of the power consumption.

In view of the above situation, it is an object of the present invention to further reduce the power consumption.

In order to solve the above problem, a first aspect of the present invention is a display apparatus including; a display unit having pixels each of which is formed of a self-luminous element; and a controller configured to reduce luminance of the pixel that has not changed for a predetermined period of time or longer.

In the display apparatus according to the present invention, the controller may be configured to determine some of the pixels for which luminance is reduced at a same timing as a region, and to restore the luminance of all of the pixels in the region when the luminance of any of the pixels in the region is to be restored.

In the display apparatus according to the present invention, the controller may be configured to further reduce the luminance of the pixel when the pixel with reduced luminance has not changed for a predetermined period of time or longer.

In the display apparatus according to the present invention, the self-luminous element may be an organic EL element.

To solve the above problem, a second aspect of the present invention is a display apparatus including; a display unit having pixels each of which is formed of a self-luminous element; and a controller configured to divide the display unit into function dependent regions, and to reduce luminance of the pixels in the function dependent region when the pixels in the function dependent region have not changed for a predetermined period of time or longer.

In the display apparatus according to the present invention, the controller may be configured to further reduce the luminance of the pixels in the function dependent region when the pixels in the function dependent region with reduced luminance have not changed further for a predetermined period of time or longer.

In the display apparatus according to the present invention, weighting values according to importance of display content are respectively preset for the function dependent regions, and the controller may be configured to reduce the luminance of the pixels in the function dependent region with low importance display content, based on the weighting values.

In the display apparatus according to the present invention, weighting values according to importance of display content are respectively preset for the function dependent regions, and the controller may be configured to set, based on the weighting values, a duration to a time at which a luminance reduction is commenced to be longer in the function dependent region with high importance display content than in the function dependent region with low importance display content.

In the display apparatus according to the present invention, a main-and-sub relationship may be preset for the function dependent regions, and the controller may be configured to simultaneously reduce, based on the main-and-sub relationship, luminance of the function dependent region to which a sub-part of the main-and-sub relationship is assigned when luminance of the function dependent region to which a main-part of the main-and-sub relationship is assigned is to be reduced.

In the display apparatus according to the present invention, a main-and-sub relationship may be preset for the function dependent region, and the controller may be configured to simultaneously restore, based on the main-and-sub relationship, luminance of the function dependent region to which a sub-part of the main-and-sub relationship is assigned when luminance of the function dependent region to which a main-part of the main-and-sub relationship is assigned is to be restored.

In the display apparatus according to the present invention, the self-luminous element may be an organic EL element.

Effects of the Invention

According to the present invention, a portion where there is no change for a predetermined period of time or more is assumed as a portion to which the user does not pay attention, and the luminance of this portion is reduced. Accordingly, the power consumption can be further reduced without giving discomfort or inconvenience to the user.

Moreover, according to the present invention, the display unit is divided into a plurality of function dependent regions, and a function dependent region where there is no change for a predetermined period of time or more is assumed as a region to which the user does not pay attention, and the luminance of this function dependent region is reduced. Accordingly, the power consumption can be further reduced without giving discomfort or inconvenience to the user.

BRIEF DESCRIPTION OF THE DRAWINGS

FIG. 10A is a schematic diagram of a table specifying an attribute of each function dependent region of various applications in the other embodiment of the present invention.

FIG. 10B is a schematic diagram of a table specifying an attribute of each function dependent region of various applications in the other embodiment of the present invention.

FIG. 10C is a schematic diagram of a table specifying an attribute of each function dependent region of various applications in the other embodiment of the present invention.

DESCRIPTION OF THE REFERENCE SYMBOLS

1 . . . display apparatus, 100 . . . portable terminal device, 2 . . . display unit (display), 2*a* . . . self-luminous element, 3 . . . pixel driver (driver), 4 . . . memory, 5 . . . controller, 6 . . . operation unit, 7 . . . clock unit, 71 . . . state display region, 72 . . . contents region, 73 . . . menu bar, 74 . . . battery state-of-charge display, 75 . . . reception level display, 76 . . . clock, 77 . . . finish button, 78 . . . function button, 79 . . . determine button, 8 . . . transmitting and receiving unit

BEST MODE FOR CARRYING OUT THE INVENTION

Figure 1:
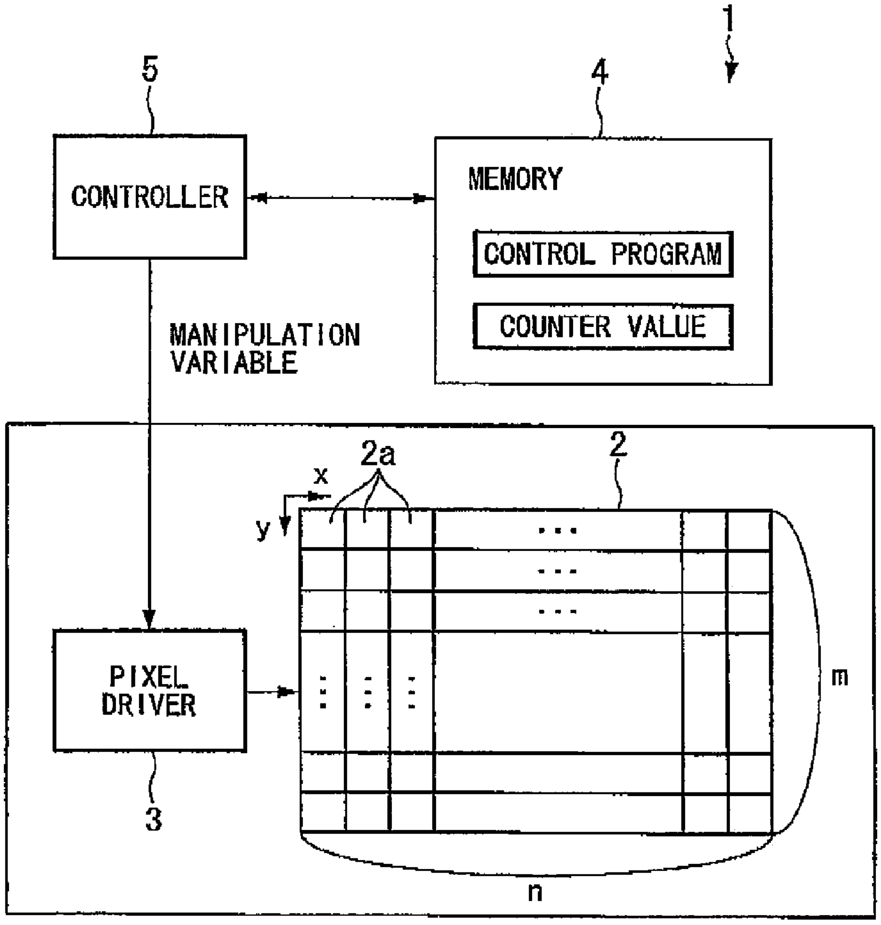
FIG. 1 is a block diagram showing a configuration of a display apparatus in an embodiment of the present invention.

Next is a description of an embodiment of the present invention with reference to the drawings. FIG. 1 is a block diagram of a configuration of a display apparatus 1 in the embodiment. The display apparatus 1 includes; a display unit 2 (display), a pixel driver 3, a memory 4, and a controller 5 (control unit). In the display unit 2, self-luminous elements 2*a* such as organic EL elements are arranged in predetermined numbers (m and n) in the X direction and the Y direction. Each self-luminous element 2*a* in the display unit 2 corresponds to a pixel G (x, y) in an image display. The pixel driver 3 drives the respective self-luminous elements 2*a*.

The memory 4 stores a control program to be executed by the controller 5, various data required for executing the control program, and an operation result when the controller 5 executes the control program. As a characteristic of the display apparatus 1, the memory 4 stores a counter value allocated to each self-luminous element 2*a* (that is, each pixel G (x, y)) as one of the operation results.

The controller 5 processes various images stored in the memory 4 based on the control program to display the various images on the display unit 2. More, specifically, the controller 5 generates a manipulation variable corresponding to each self-luminous element 2*a* for specifying the luminance of each pixel G (x, y) based on the various images, and outputs the manipulation variable to the pixel driver 3. The controller 5 also performs a calculation process of the counter value and a power saving process based on the counter value, as a characteristic control process based on the control program.

Figure 2:
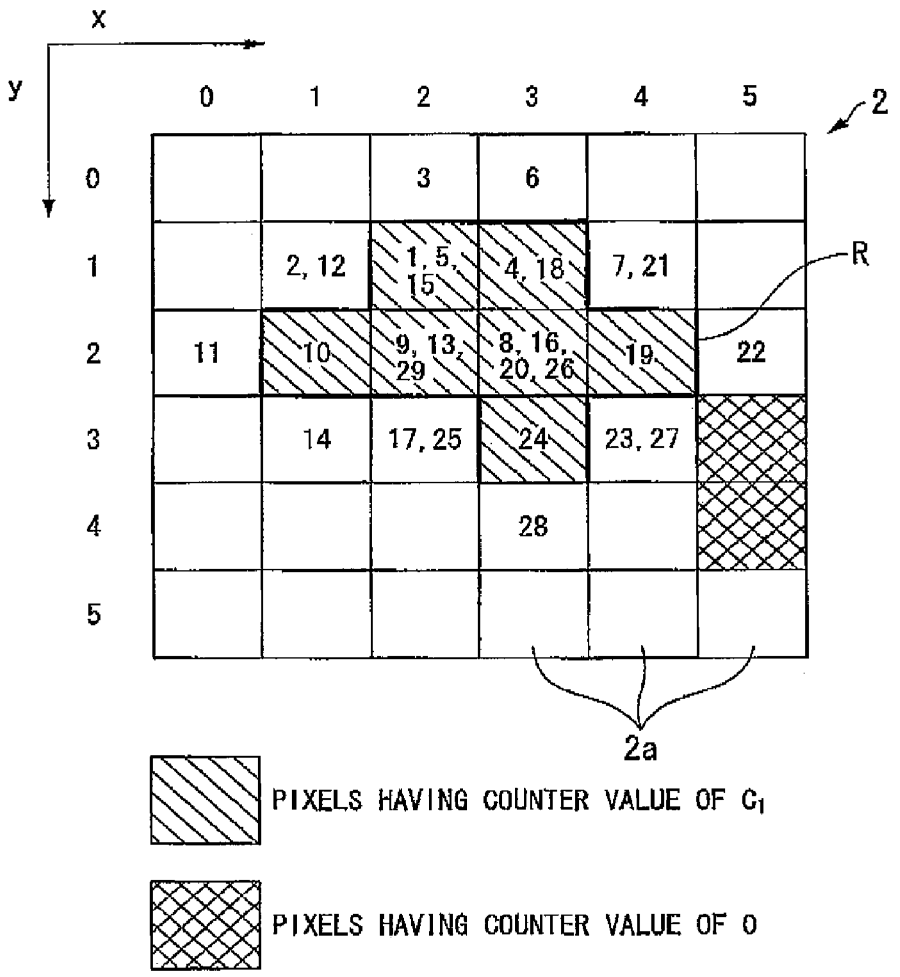
FIG. 2 is a schematic diagram showing an example of a region formed by grouping respective pixels on a display unit under a predetermined condition in the embodiment of the present invention.

FIG. 2 is a front elevation of the display unit 2 showing an example of a region R formed by grouping the respective pixels G (x, y) formed from the respective self-luminous elements 2*a* on the display unit 2, under a predetermined condition. When there are pixels G (x, y) adjacent to each other in which the manipulation variable has not changed in a predetermined period, the controller 5 integrates these pixels G (x, y) as a region R as shown in FIG. 2, and stores the region R in the memory 4, by performing processes shown in FIG. 3 to FIG. 6 described later. Moreover, when the number of the pixels G (x, y) included in the region R is equal to or more than a specified value, the controller 5 determines that the region R belongs to a luminance control region K, and performs a process for reducing the luminance of the pixels G (x, y) included in the region R. When there is a change in the manipulation variable of a pixel G (x, y) with the luminance reduced, in the region R belonging to the luminance control region K, the controller 5 performs a process for restoring the luminance of all pixels G (x, y) in the region R including the pixel G (x, y).

Moreover, the controller 5 performs a control for reducing the luminance at two stages of luminance $L_0$ and $L_1$. Here, when it is assumed that the normal luminance when the luminance is not controlled is 1, and the luminance when light emission is not performed is 0, then $0 \leq L_0 < L_1 < 1$. A region having luminance $L_0$ is a luminance control region $K_0$, and a region having luminance $L_1$ is a luminance control region $K_1$.

Hereunder is a detailed description of an operation of the display apparatus 1 following along a process procedure of the controller 5 based on the control program stored in the memory 4 shown in the flowcharts in FIG. 3 to FIG. 6.

Figure 3:
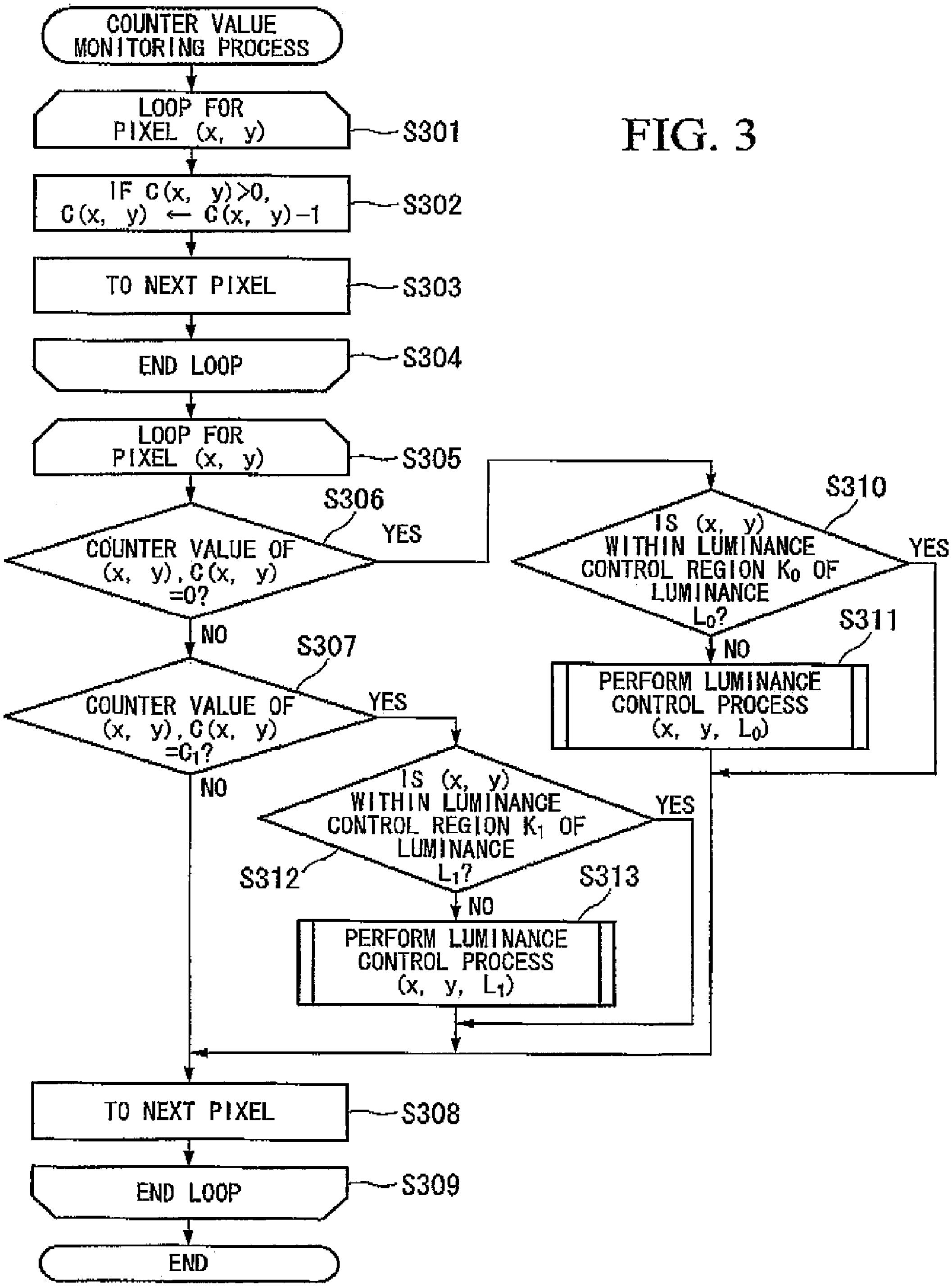
FIG. 3 is a flowchart showing a flow of a power saving process in the embodiment of the present invention.

FIG. 3 is a flowchart showing a flow of the power saving process. The controller 5 repeatedly performs the process at a predetermined interval. The counter value C (x, y) of the pixel G (x, y) used for the process is set to all the pixels and stored in the memory 4. All counter values C (x, y) are initialized to an initial value $C_0$ at the beginning.

S301 to S304 are steps performed for updating the counter value C (x, y) for all the pixels. That is, the controller 5 decrements the counter value when the counter value C (x, y) is larger than 0 (S302). When the counter value C (x, y) is already 0, the controller 5 does not perform anything. Then the controller 5 proceeds to the next pixel G (x, y) (S303) to perform the same process.

S305 to S309 are steps for reducing the luminance of the pixel G (x, y) corresponding to the counter value C (x, y) updated in steps S301 to S304. Reduction of the luminance is performed when the counter value C (x, y) is a predetermined constant $C_1$ smaller than the initial value $C_0$ and when the counter value C (x, y) is 0.

The controller 5 first determines whether the counter value C (x, y) is equal to 0 (S306). If the counter value C (x, y) is not equal to 0, the controller 5 does not perform anything and proceeds to the next step (No in S306). Subsequently, the controller 5 determines whether the counter value C (x, y) is equal to the constant $C_1$ (S307). If the counter value C (x, y) is not equal to the constant $C_1$, the controller 5 does not perform anything and proceeds to the next step (No in S307). Then the controller 5 proceeds to the next pixel G (x, y) (step S308), and performs the same process.

In step S306, when the counter value C (x, y) is equal to 0 (Yes in S306), the controller 5 determines whether the pixel G (x, y) is within the luminance control region $K_0$ of the luminance $L_0$ (S310). When the pixel G (x, y) is not within the luminance control region $K_0$ of the luminance $L_0$ (No in S310), the controller 5 performs the luminance control process of the luminance $L_0$ (S311). When the pixel G (x, y) is within the luminance control region $K_0$ of the luminance $L_0$ (Yes in S310), the controller 5 proceeds to step S308.

Likewise, when the counter value C (x, y) is equal to the constant $C_1$ (Yes in S307), the controller 5 determines whether the pixel G (x, y) is within the luminance control region $K_1$ of the luminance $L_1$ (S312). When the pixel G (x, y) is not within the luminance control region $K_1$ of the luminance $L_1$ (No in S312), the controller 5 performs the luminance control process of the luminance $L_1$ (S313). When the pixel G (x, y) is within the luminance control region $K_1$ of the luminance $L_1$ (Yes in S312), the controller 5 proceeds to step S308.

Figure 4:
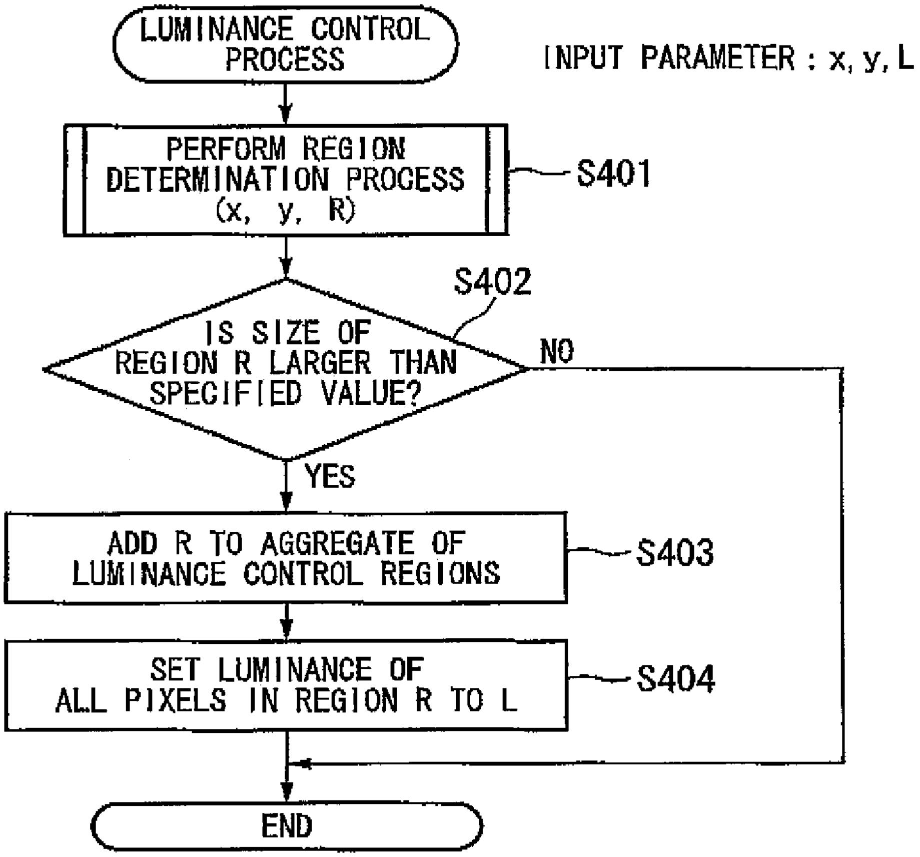
FIG. 4 is a flowchart showing a flow of a luminance control process in the embodiment of the present invention.

FIG. 4 is a flowchart showing a flow of the luminance control process in steps S311 and S313. The controller 5 first performs a region determination process (S401), in which the controller 5 searches for a pixel G (x, y) in which the counter value C (x, y) and a counter value C (x', y') are the same in the peripheral pixels G (x', y') of the pixel G (x, y), integrates these pixels into a region R, and stores the region R in the memory 4.

The controller 5 then determines whether the number of pixels included in the region R is equal to or more than a specified value (S402). When the number of pixels is not equal to or more than the specified value (No in S402), the controller 5 finishes the process. When the number of pixels is equal to or more than the specified value (Yes in S402), the controller 5 adds the region R to an aggregate of the luminance control regions K (S403) to reduce the luminance of the pixels included in the region R (S404).

Figure 5:
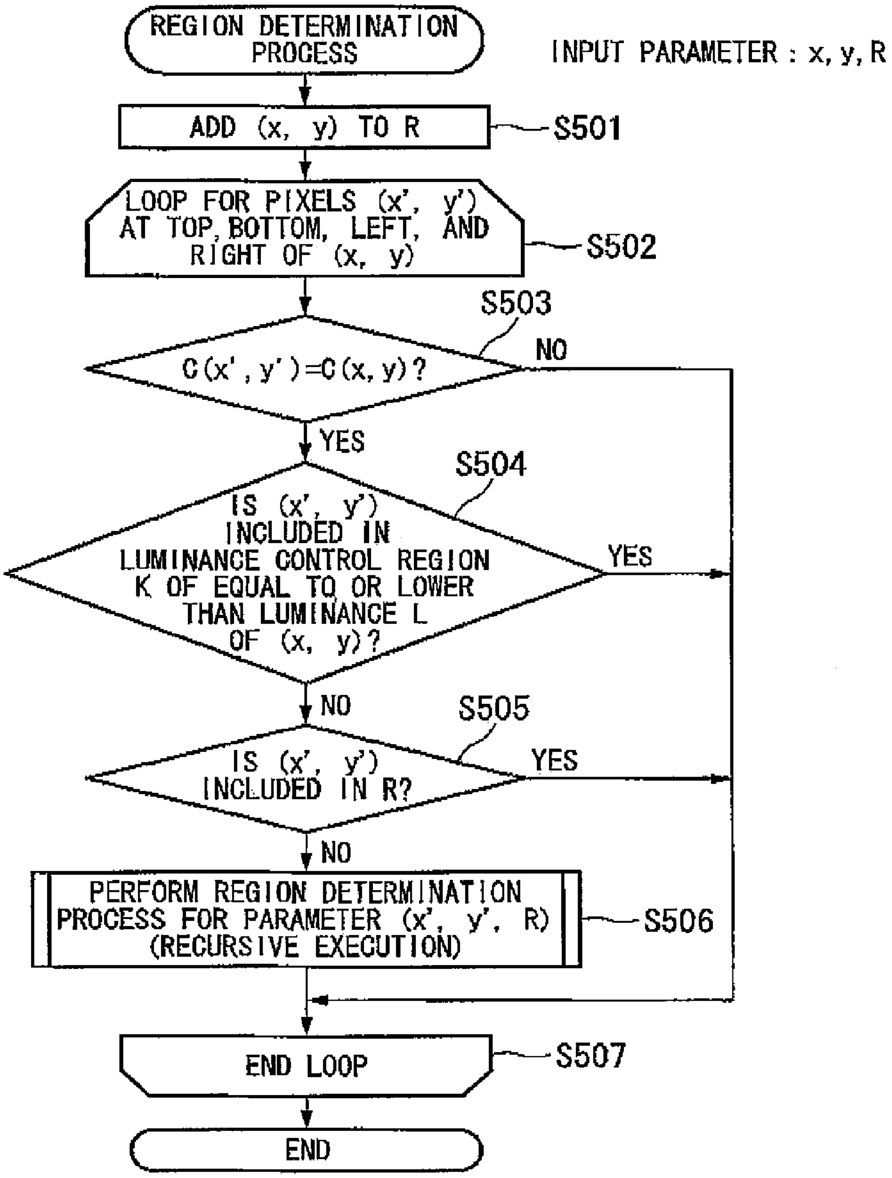
FIG. 5 is a flowchart showing a flow of a region determination process in the embodiment of the present invention.

FIG. 5 is a flowchart showing the flow of the region determination process in step S401. The controller 5 first adds the pixel G (x, y) to the region R (S501). Subsequent steps S502 to S507 are steps performed for the pixel positioned at the left, right, top, and bottom of the pixel G (x, y). The process is performed clockwise in the order of left, top, right, and bottom. The controller 5 determines whether the counter value C (x', y') of the pixel G (x', y') at the top, bottom, left, or right of the pixel G (x, y) is equal to the counter value C (x, y) of the pixel G (x, y) (S503), and if not (No in S503), finishes the process. If the counter value C (x', y') is equal to the counter value C (x, y) (Yes in S503), the controller 5 determines whether a coordinate (x', y') is included in the luminance control region K of equal to or lower than luminance L of a coordinate (x, y) (S504), and if the coordinate (x', y') is included therein (Yes in S504), finishes the process. If not (No in S504), the controller 5 determines whether the pixel G (x', y') is included in the region R (S505), and if the pixel G (x', y') is included therein (Yes in S505), finishes the process. If not (No in S505), the controller 5 recursively executes the region determination process for a parameter (x', y', R) of the pixel G (x', y'). The pixel G (x', y') is added to the region R in step S501 when the region determination process is recursively executed.

Thus, if the process is repeated, in FIG. 2, when the counter value C (x, y) of the pixel G (x, y) in the hatched portion is $C_1$ (or 0), the process is performed in the order of numbers added to the respective pixels G (x, y) (the pixel G (x, y) added to the region R first is given number 1), and the pixels G (x, y) in the hatched portion are integrated and designated as region R.

More specifically, when a pixel G (2, 1) is added to the region R (S501), the process is performed with respect to a pixel G (1, 1) positioned at the left of the pixel G (2, 1). Subsequently, the process is performed with respect to a pixel G (2, 0), and then with respect to a pixel G (3, 1). The pixel G (3, 1) has a counter value C (3, 1) of $C_1$ the same as the counter value C (2, 1) of the first pixel G (2, 1), and at this point in time, the pixel G (3, 1) is not included in the luminance control region K1 (No in S504), and is not included in the region R (No in S505). Therefore, the region determination process is recursively executed with respect to the pixel G (3, 1), and the pixel G (3, 1) is added to the region R in step S501 where the region determination process is recursively executed.

Likewise, the process is recursively executed with respect to the other pixels G (x, y), and finally, all the pixels G (x, y) in the hatched portion in FIG. 2 are added to the region R.

Figure 6:
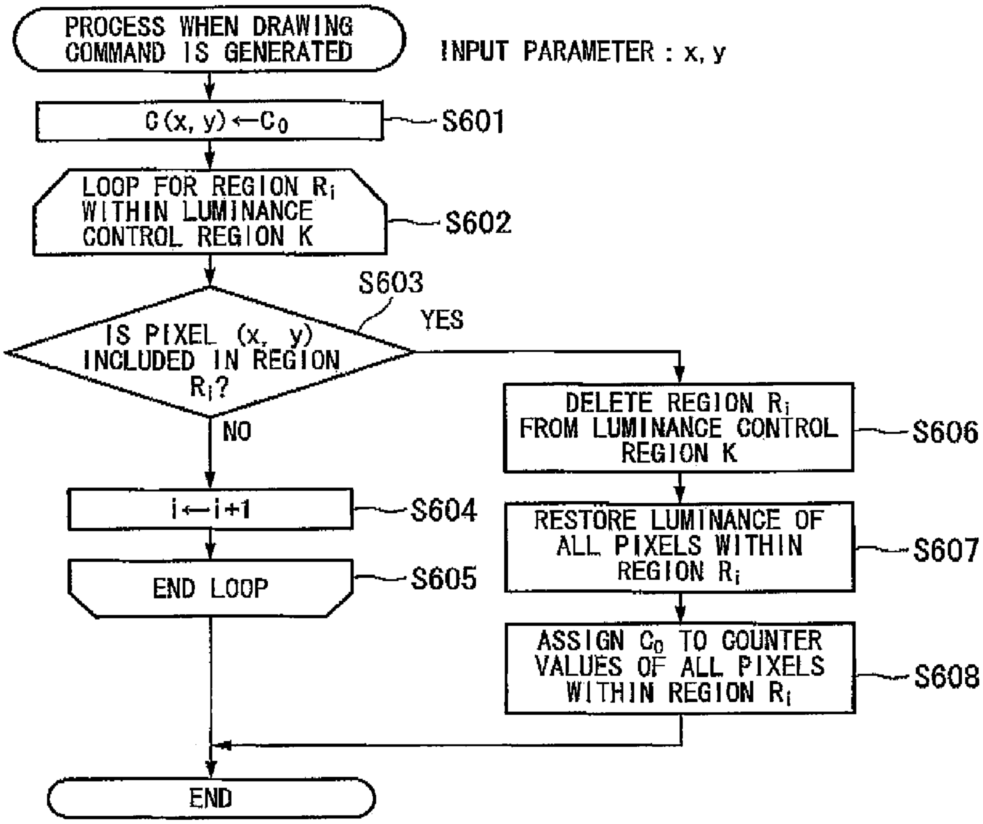
FIG. 6 is a flowchart showing a flow of a process when a drawing command is generated in the embodiment of the present invention.

FIG. 6 is a flowchart showing the flow of a process when a drawing command is generated. The controller 5 assigns an initial value $C_0$ to the counter value C (x, y) of the pixel G (x, y), for which a drawing command has been generated, to thereby initialize the counter (S601). Subsequent steps S602 to S605 are steps for a region $R_1$ included within the luminance control region K. The controller 5 determines whether the pixel G (x, y), for which the drawing command has been generated, is included in the region $R_1$ (S603), and if not (No in S603), performs processing with respect to the next region $R_1$ (S604). If the pixel G (x, y) is included in the region $R_1$ (Yes in S603), the controller 5 deletes the region $R_1$ from the luminance control region K (S606), and restores the luminance of all pixels included in the region $R_1$ (S607). The controller 5 then assigns the initial value $C_0$ to the counter value C (x, y) of all the pixels G (x, y) included in the region $R_1$, to initialize the counter (S608), to finish the process. If the pixel G (x, y), for which a drawing command has been generated, does not belong to any of the regions $R_1$ included in the luminance control region K (S605), the controller 5 finishes the process.

Next an example of the luminance control by the above configuration and the process procedure will be described by showing a display state of the display unit 2. FIGS. 7A to 7H are front elevations of the display unit 2 showing an example of a series of luminance control. The time from the state in FIG. 7A to the state in FIG. 7B, the time from the state in FIG. 7B to the state in FIG. 7C, and the time from the state in FIG. 7C to the state in FIG. 7D are all 5 seconds, the time from the state in FIG. 7D to the state in FIG. 7E is 10 seconds, and the time from the state in FIG. 7E to the state in FIG. 7F, the time from the state in FIG. 7F to the state in FIG. 7G, and the time from the state in FIG. 7G to the state in FIG. 7H are all 5 seconds.

For example, if it is assumed that the initial value $C_0$ is 30 seconds and the constant $C_1$ is 20 seconds, and the power saving process is executed every second, then when there is a plurality of pixels adjacent to each other in which there is no change for 10 seconds in numbers equal to or larger than a specified value, the luminance thereof is reduced to $L_1$. When the time has elapsed as it is for 20 seconds, the luminance thereof is further reduced to $L_0$.

Figure 7A:
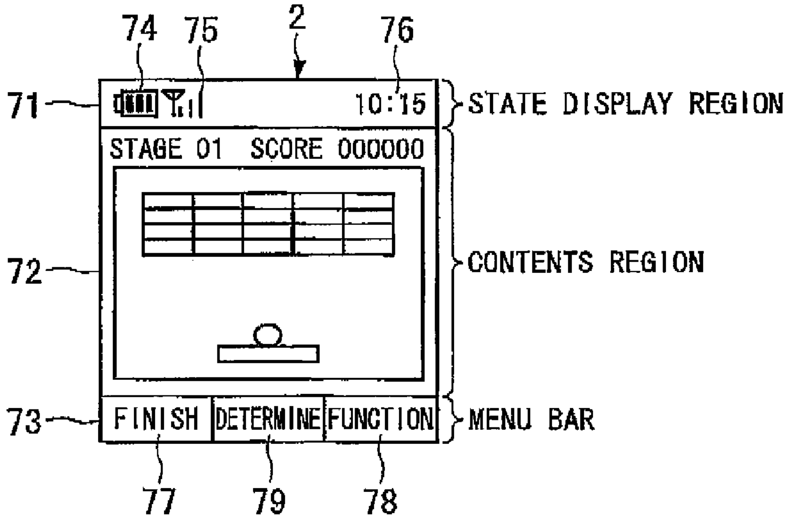
FIG. 7A is a front elevation of a display surface showing an example of a series of luminance control in the embodiment of the present invention.

At first, as shown in FIG. 7A, the display unit 2 is divided into three according to the contents to be displayed, and includes a state display region 71, a contents region 72, and a menu bar 73. The state display region 71 includes a battery state-of-charge display 74, a reception level display 75, and a clock 76. The contents region 72 is a region where a dynamic image such as a game screen is displayed, and it is assumed that drawing is carried out at all times. That is, there are changes all the time in the pixels in this region. The menu bar 73 is a region where a button for operating an application being displayed in the contents region 72, and in this example, a finish button 77 for finishing the game screen being displayed in the contents region 72, a function button 78 for displaying various functions, and a determine button 79 used for selecting and determining alternatives displayed on the screen are displayed.

Figure 7B:
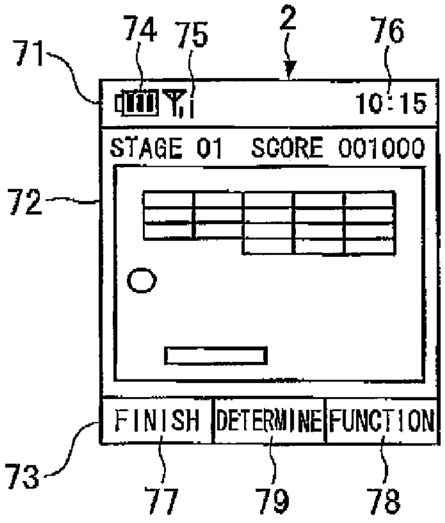
FIG. 7B is a front elevation of the display surface showing an example of the series of luminance control in the embodiment of the present invention.
Figure 7C:
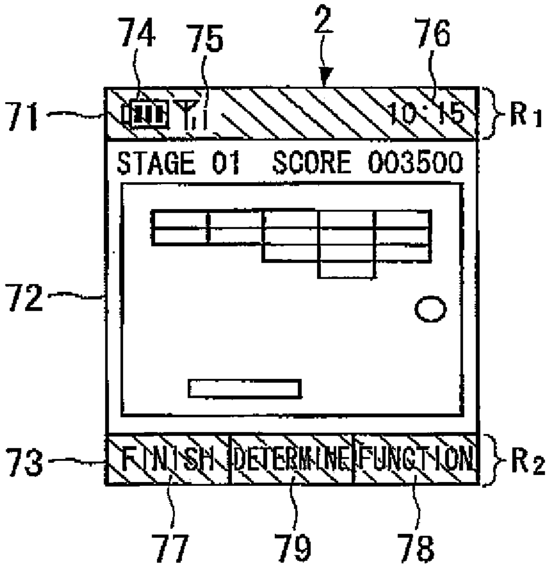
FIG. 7C is a front elevation of the display surface showing an example of the series of luminance control in the embodiment of the present invention.
Figure 7D:
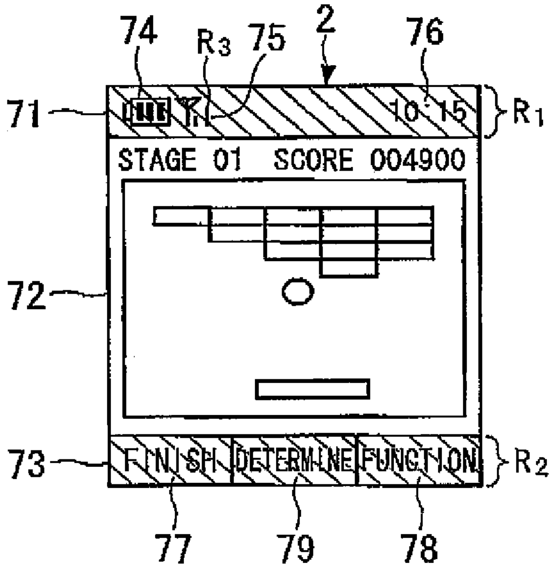
FIG. 7D is a front elevation of the display surface showing an example of the series of luminance control in the embodiment of the present invention.
Figure 7E:
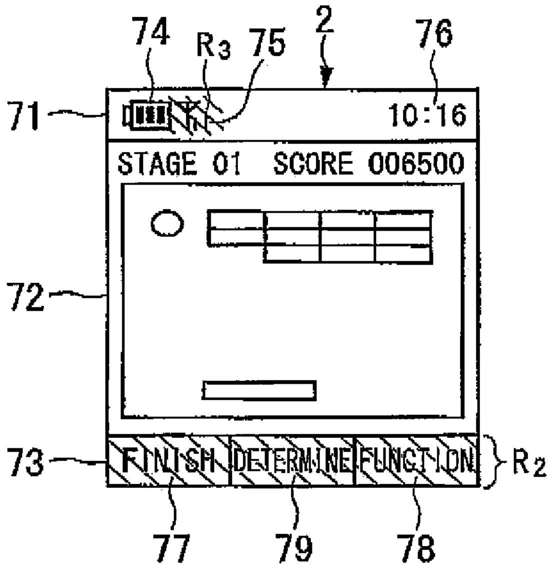
FIG. 7E is a front elevation of the display surface showing an example of the series of luminance control in the embodiment of the present invention.

FIG. 7B shows the display unit 2 after 5 seconds have passed from the state displayed in FIG. 7A. At this time, the reception level decreases, and the reception level display 75 is redrawn. FIG. 7C shows the display unit 2 after 5 seconds have passed from the state displayed in FIG. 7B. At this time, 10 seconds have passed without redrawing in the regions other than the contents region 72 and the reception level display 75. Therefore, the pixels constituting the portions other than the reception level display 75 in the state display region 71 are integrated as a region $R_1$ and the pixels constituting the menu bar 73 are integrated as a region $R_2$, and included in the luminance control region $K_1$, and the luminance of the pixels in the regions $R_1$ and $R_2$ is reduced by one level from 1 to $L_1$. That is, the peripheral pixels operating at the same timing (with the luminance reduced) are determined as a region, and as described below, operate as the region at the time of restoration.

FIG. 7D shows the display unit 2 after 5 seconds have passed from the state displayed in FIG. 7C. At this time, 10 seconds have passed without redrawing in the reception level display 75. Therefore, the pixels constituting the reception level display 75 are integrated as a region $R_3$ and the luminance of the pixels in the region $R_3$ is reduced by one level from 1 (default luminance) to $L_1$.

FIG. 7E shows the display unit 2 after 10 seconds have passed from the state displayed in FIG. 7D. At this time, the time displayed in the clock 76 has changed, and the clock 76 has been redrawn. Then, because there is a change in the pixel included in the region $R_2$, the region $R_2$ is deleted from the luminance control region $K_1$, and the luminance of the pixels in a portion other than the reception level display 75 in the state display region 71 is restored.

Figure 7F:
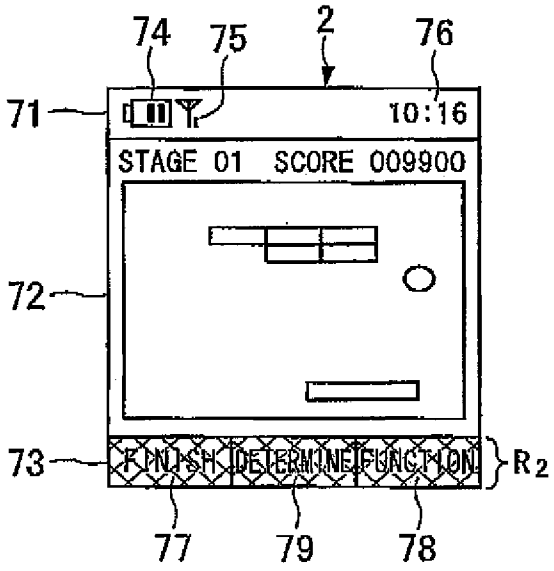
FIG. 7F is a front elevation of the display surface showing an example of the series of luminance control in the embodiment of the present invention.

FIG. 7F shows the display unit 2 after 5 seconds have passed from the state displayed in FIG. 7E. At this time, the state of charge of the battery and the reception level decrease, and the battery state-of-charge display 74 and the reception level display 75 are redrawn. With regard to the menu bar 73, since 30 seconds have passed without redrawing, the region $R_2$ in which the pixels constituting the menu bar 73 are integrated is included in the luminance control region $K_0$, and the luminance of the pixels in the region $R_2$ is further reduced by one level from $L_1$ to $L_0$.

Figure 7G:
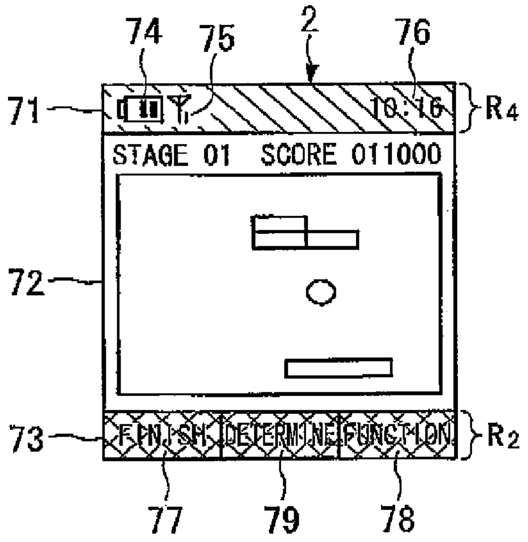
FIG. 7G is a front elevation of the display surface showing an example of the series of luminance control in the embodiment of the present invention.
Figure 7H:
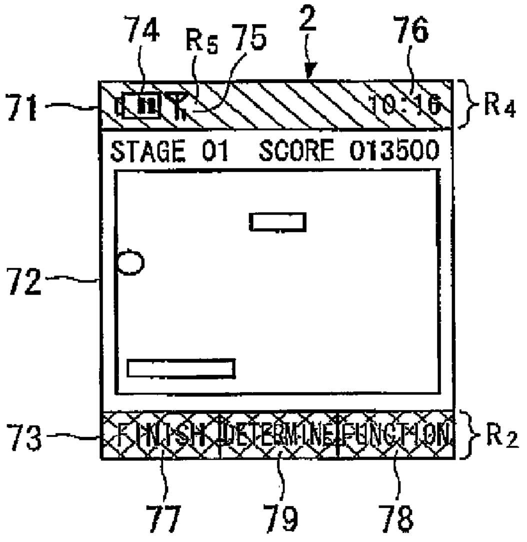
FIG. 7H is a front elevation of the display surface showing an example of the series of luminance control in the embodiment of the present invention.

FIG. 7G shows the display unit 2 after 5 seconds have passed from the state displayed in FIG. 7F. At this time, with regard to the portion in the state display region 71 other than the battery state-of-charge display 74 and the reception level display 75, since 10 seconds have passed without redrawing, this portion is integrated as a region R4 and included in the luminance control region $K_1$, and the luminance of the pixels in the region R4 is further reduced by one level from 1 to $L_1$.

FIG. 7H shows the display unit 2 after 5 seconds have passed from the state displayed in FIG. 7G. At this time, 10 seconds have passed without redrawing in the battery state-of-charge display 74 and the reception level display 75. Therefore, the pixels constituting these portions are integrated as a region $R_5$ and included in the luminance control region $K_1$, and the luminance of the pixels in the region $R_5$ is reduced by one level from 1 to $L_1$.

In this embodiment, the luminance is controlled so as to be reduced in two levels of $L_1$ and $L_2$, however the level may be one or three or more at the time of implementation.

Moreover the display apparatus in this embodiment is effective if it is applied to a battery-driven portable terminal device. The portable terminal device includes battery-driven devices, for example, a mobile phone, a PDA, a portable TV, and a notebook PC.

Figure 8:
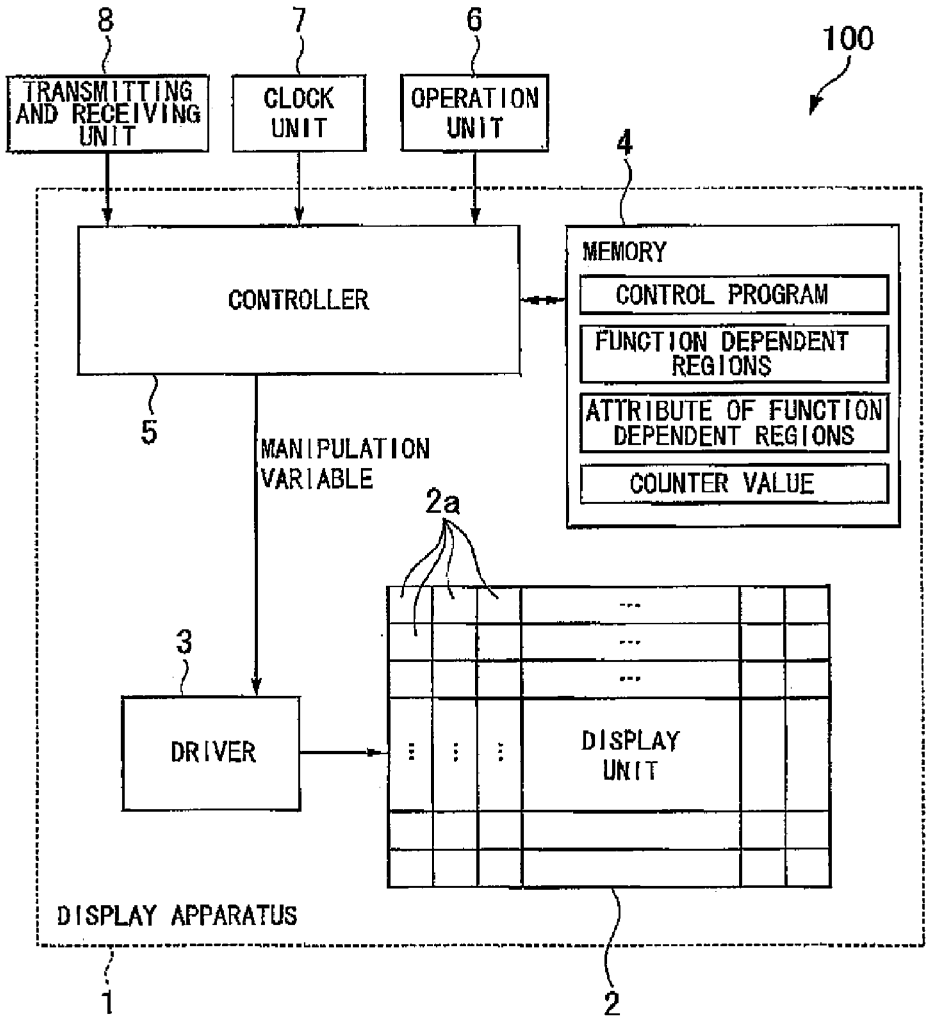
FIG. 8 is a block diagram showing a configuration of a display apparatus and a portable terminal device in the other embodiment of the present invention.

Hereunder the other embodiment of the present invention will be described with reference to the drawings. FIG. 8 is a block diagram showing a configuration of a portable terminal device 100 including a display apparatus 1 in this embodiment. The display apparatus 1 includes; a display unit 2 (display), a driver 3, a memory 4, and a controller 5. The portable terminal device 100 includes an operation unit 6, a clock unit 7, and a transmitting and receiving unit 8, other than the display apparatus 1. In the display unit 2, self-luminous elements 2*a* such as organic EL elements are arranged in predetermined numbers. Each self-luminous element 2*a* in the display unit 2 corresponds to a pixel in the image display. The driver 3 drives each self-luminous element 2*a*.

The memory 4 stores a control program to be executed by the controller 5, various data required for executing the control program, various applications, and operation results when the controller 5 executes the control program. As a characteristic of the display apparatus 1, the memory 4 stores function dependent regions in which respective pixels in the display unit 2 are divided into a plurality of groups according to the display content of various screens to be displayed based on the various applications, attributes of respective function dependent regions, and counter values allocated to respective function dependent regions.

The controller 5 processes various images stored in the memory 4 based on the control program to display the various images on the display unit 2. More specifically, the controller 5 generates a manipulation variable corresponding to each self-luminous element 2*a* for specifying the luminance of each pixel based on the various images, and outputs the manipulation variable to the driver 3. The controller 5 also performs; a read process of the function dependent regions corresponding to the application being executed, a calculation process of the counter value, and a power saving process with respect to the function dependent regions based on the counter value, as a characteristic control process based on the control program.

The operation unit 6 accepts an operation by a user, and outputs an operation signal corresponding to the operation content to the controller 5. The clock unit 7 measures time, and outputs a pulse to the controller 5 for each unit time. The controller 5 uses the pulse input from the clock unit 7 to calculate the counter value.

The transmitting and receiving unit 8 performs wireless communication relating to telephone conversation, email transfer and the like with a base station under control of the controller 5. Voice of a calling party fetched by a microphone (not shown) included in the portable terminal device 100 is transmitted to the base station via the transmitting and receiving unit 8, and the voice of the calling party received by the transmitting and receiving unit 8 from the base station is output to a speaker (not shown) included in the portable terminal device 100 and vocalized. Email is transmitted from the transmitting and receiving unit 8 to a destination via the base station. The email transmitted from the base station is received by the transmitting and receiving unit 8 and output to the controller 5.

Figure 9A:
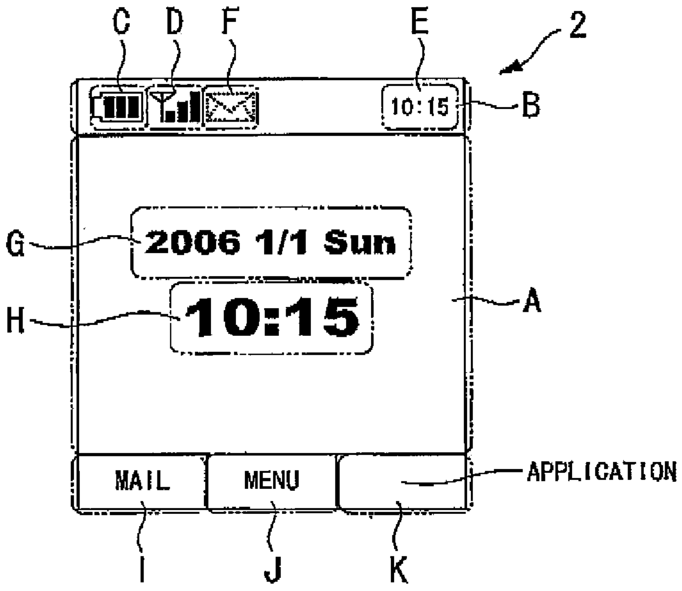
FIG. 9A is a schematic diagram showing an example of a region formed by grouping respective pixels on a display unit under a predetermined condition in the other embodiment of the present invention.
Figure 9B:
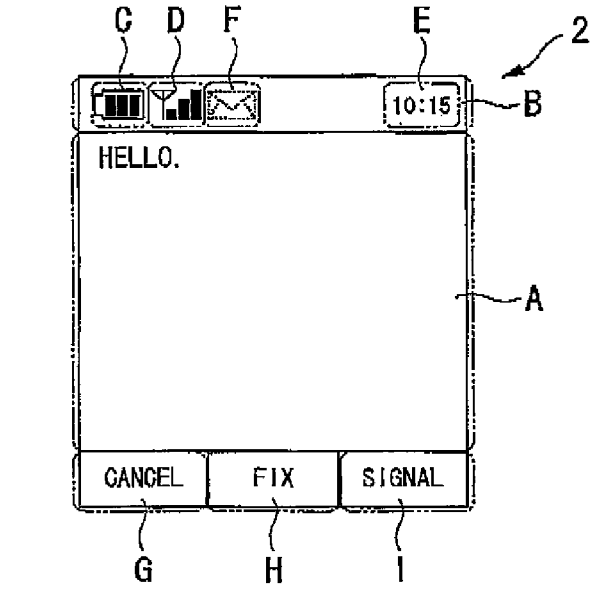
FIG. 9B is a schematic diagram showing an example of a region formed by grouping respective pixels on the display unit under a predetermined condition in the other embodiment of the present invention.

FIGS. 9A and 9B are front elevations of the display unit 2 showing an example of the function dependent regions. A screen of a different content is displayed on the display unit 2 according to the various applications. The function dependent regions are set for various screens corresponding to the various applications, and the screen is divided into a plurality of regions by function. FIG. 9A shows function dependent regions A to K obtained by dividing a screen of a waiting application into a plurality of regions by function, and FIG. 9B shows function dependent regions A to I obtained by dividing a screen of a message creation application into a plurality of regions by function.

The function dependent regions A to K in FIG. 9A will be described in detail. Region A is a contents region in which various contents are displayed. Region B is a state display region for displaying the state of the portable terminal device 100. Region G for displaying date and day of the week, and region H for displaying time are provided on region A. Region C for displaying the state of charge of the battery, region D for displaying the reception level, region E for displaying time, and region F for displaying an icon indicating that there is an unread message are provided on region B. Regions I, J, and K respectively indicate a function of a general-purpose button (not shown), whose function changes according to the application included in the portable terminal device 100, corresponding to the application currently being executed.

The function dependent regions A to I in FIG. 9B will be described in detail. Region A is a region for displaying the content of a message being created. Region B is a state display region for displaying the state of the portable terminal device 100. Region C for displaying the state of charge of the battery, region D for displaying the reception level, region E for displaying time, and region F for displaying an icon indicating that there is an unread message are provided on region B. Regions G, H, and I respectively indicate a function of a general-purpose button (not shown), whose function changes according to the application included in the portable terminal device 100, corresponding to the application currently being executed.

Figure 9C:
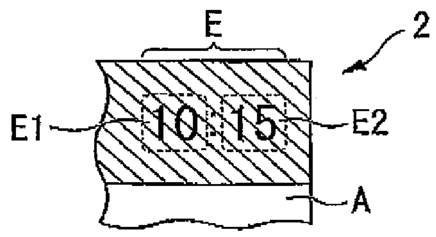
FIG. 9C is a schematic diagram showing an example of a region formed by grouping respective pixels on the display unit under a predetermined condition in the other embodiment of the present invention.

FIG. 9C is a front elevation of a part of the display unit 2, showing an example in which region E for displaying the time in FIGS. 9A and 9B is subdivided. Region E1 is a region for displaying hours, and region E2 is a region for displaying minutes.

FIGS. 10A to C are schematic diagrams of tables specifying an attribute of each function dependent region shown in FIGS. 9A to 9C. FIG. 10A corresponds to FIG. 9A, and FIG. 10C corresponds to FIG. 9C.

In the tables shown in FIGS. 10A and 10B are specified; normal luminance 31 before performing the luminance reduction control, weighting 32 indicating whether the content displayed in the region is important or negligible, time 33 until the luminance determined corresponding to the weighting 32 is reduced, main-and-sub relationship 34 between the regions, threshold 35 used for the determination whether to restore the luminance, and cooperation 36 with event occurrence.

In the table shown in FIG. 10C is specified the main-and-sub relationship between region E1 and region E2 obtained by subdividing region E.

Next the operation of the display apparatus 1 configured in this manner will be described below in detail following along the flowcharts shown in FIG. 11 to FIG. 13. The flowcharts show a process procedure performed by the controller 5 based on the control program.

Figure 11:
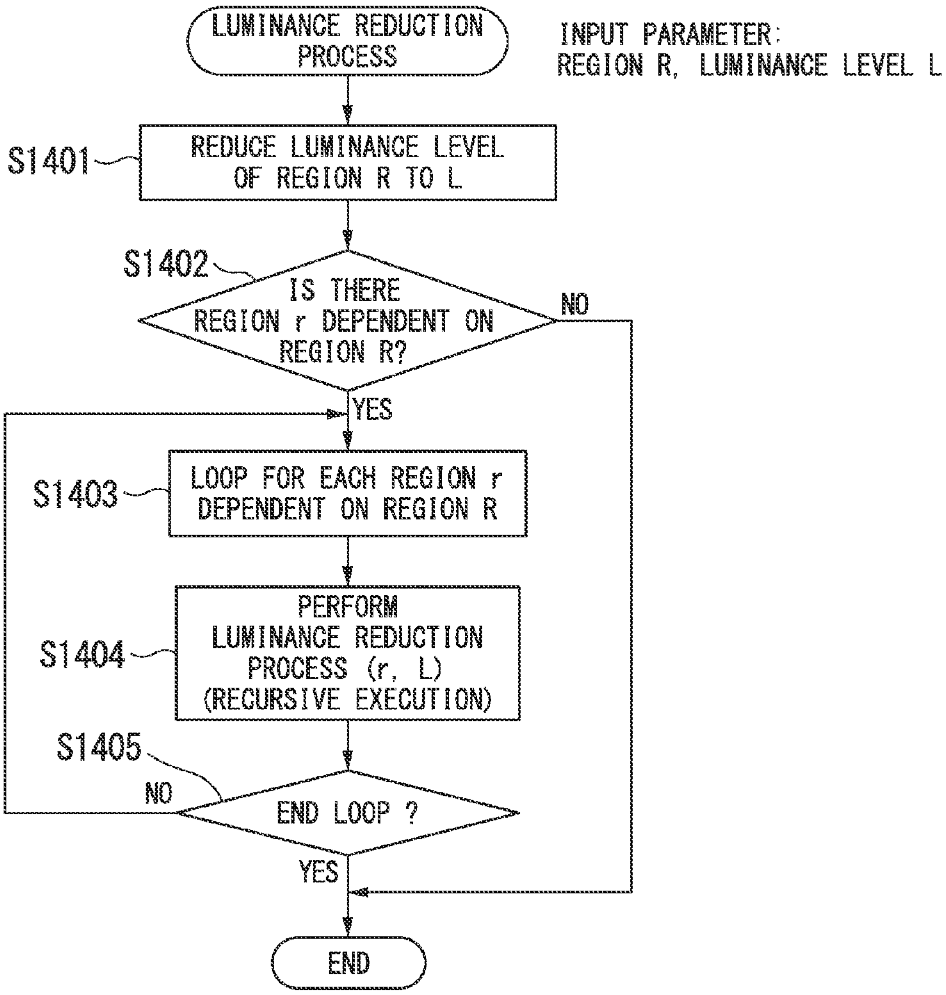
FIG. 11 is a flowchart showing a flow of a luminance reduction process in the other embodiment of the present invention.

FIG. 11 is a flowchart showing the flow of the luminance reduction process. At first, the controller 5 adds a counter value allocated to each function dependent region based on the time measured by the clock unit 7, for each function dependent region, while there is no change in the manipulation variable of all pixels included in the function dependent region. Then, for a region R in which the counter value becomes equal to the time specified by the time 33 (10 seconds or 30 seconds), a process for reducing the luminance of all the pixels included in the region R is performed (S1401). Subsequently, the controller 5 determines whether there is a region r dependent on the region R (S1402), and if there is no region r, finishes the process (No in S1402). If there is the region r dependent on the region R (Yes in S1402), the controller 5 loops the process at steps S1404 to S1405 for all regions r dependent on the region R, to recursively execute the luminance reduction process for each region r (S1403).

Figure 12:
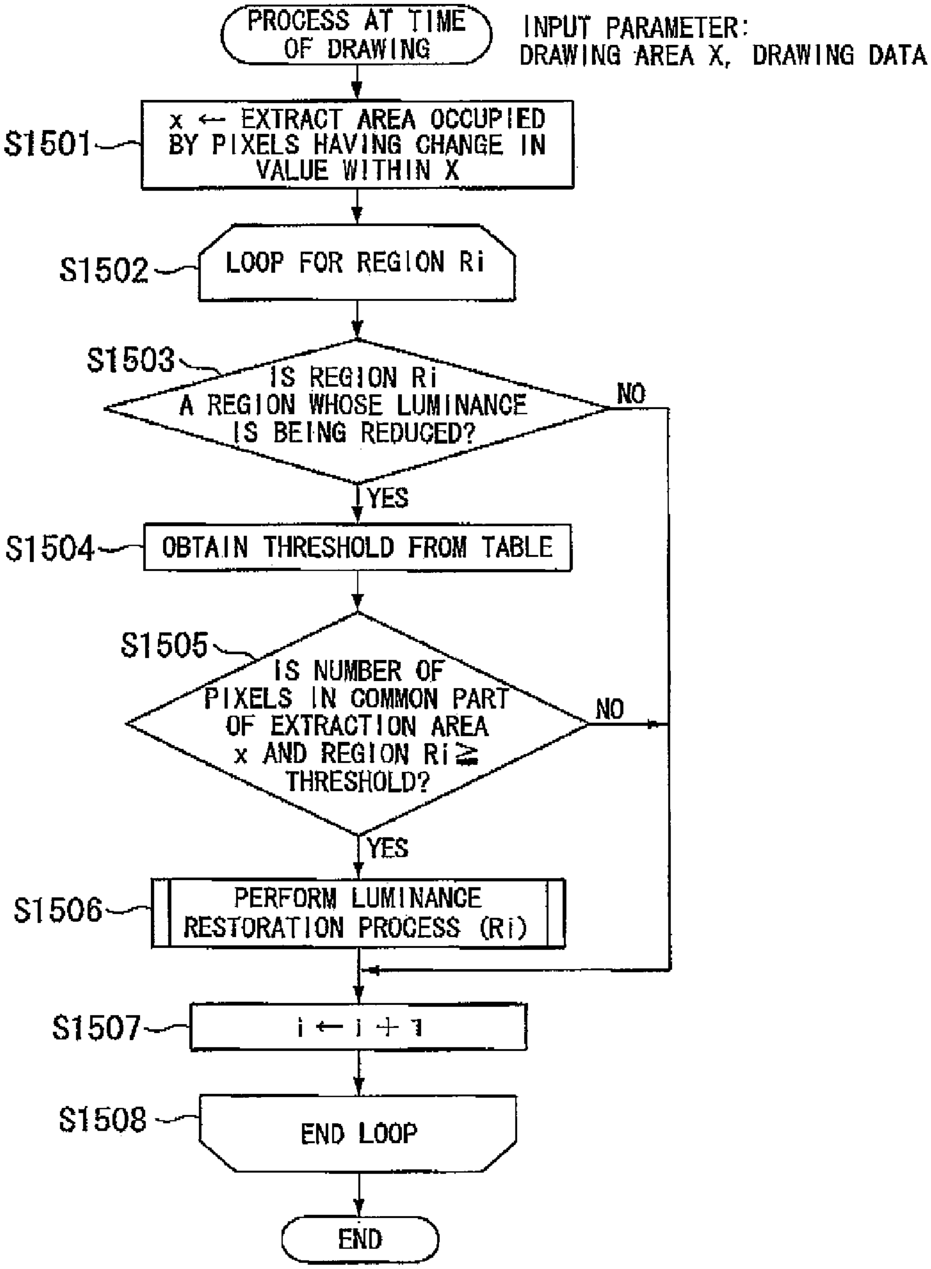
FIG. 12 is a flowchart showing a flow of a process at the time of drawing in the other embodiment of the present invention.

FIG. 12 is a flowchart showing a flow of the process at the time of drawing, that is, when there is a change in the manipulation variable of the pixel whose luminance has been reduced. At first, the controller 5 extracts an area (extraction area x) occupied by the pixels having a change in the manipulation variable among the pixels within a drawing area X (S1501). Subsequently, the process is looped at steps S1502 to S1508 for all regions $R_1$. The controller 5 first determines whether the region $R_1$ is a region whose luminance is being reduced (S1503). If the region $R_1$ is not the region whose luminance is being reduced (No in S1503), the controller 5 proceeds to the process for the next region $R_1$ (S1507). If the region $R_1$ is the region whose luminance is being reduced (Yes in S1503), the controller 5 obtains the threshold 35 from the table (S1504), to determine whether the number of pixels in a common part of the extraction area x and the region $R_1$ is equal to or larger than the threshold (S1505). If the number of pixels in the common part is not equal to or larger than the threshold (No in S1505), the controller 5 proceeds to the process for the next region $R_1$ (S1507). If the number of pixels in the common part is equal to or larger than the threshold (Yes in S1505), the controller 5 performs a luminance restoration process described later (S1506). The controller 5 then proceeds to the process for the next region $R_1$ (S1507). When the process is complete with respect to all the regions $R_1$, the controller 5 finishes the process.

Figure 13:
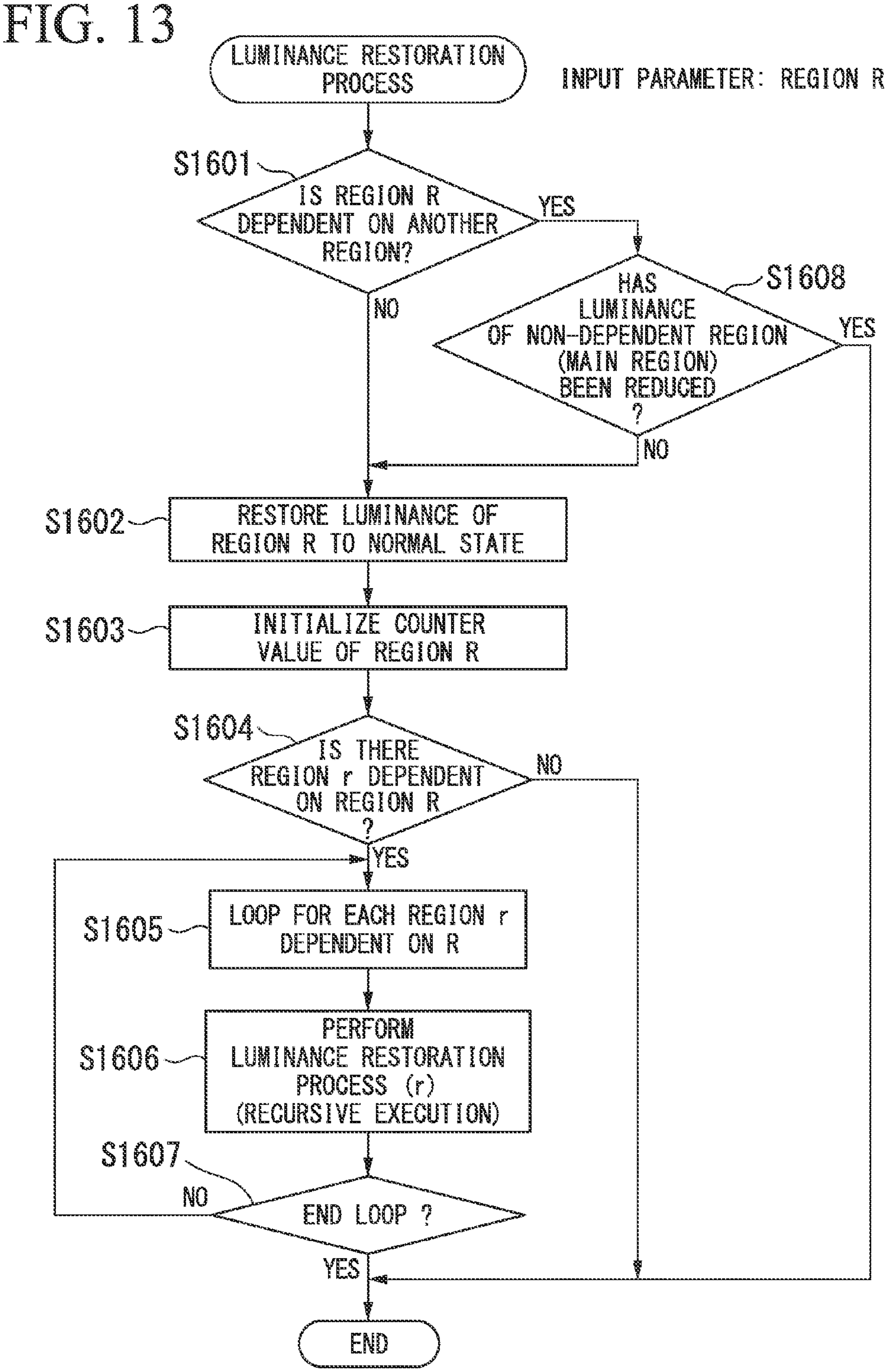
FIG. 13 is a flowchart showing a flow of a luminance restoration process in the other embodiment of the present invention.

FIG. 13 is a flowchart showing the flow of the luminance restoration (lighting) process. At first, the controller 5 determines whether a region R whose luminance is to be restored is dependent on another region (S1601). When the region R is not dependent on another region (No in S1601), the controller 5 restores the luminance of all pixels included in the region R to a normal state (100%) (S1602). Subsequently, the controller 5 initializes the counter value of the region R and determines whether there is a region r dependent on the region R (S1604). When there is no region r dependent on the region R (No in S1604), the controller 5 finishes the process. When there is the region r dependent on the region R (Yes in S1604), the controller 5 loops the process at steps S1605 to S1607 for all regions r dependent on the region R, to recursively execute the luminance restoration process for each region r (S1606). In step S1601, when the region R is dependent on another region (Yes in S1601), the controller 5 determines whether the luminance of a non-dependent region (main region), on which the region R is dependent, has been reduced (S1608). When the luminance thereof has been reduced, the controller 5 finishes the process. If not, the controller 5 proceeds to step S1602 to continue the process.

Next an example of luminance control by the above configuration and the process procedure will be described by showing the display state of the display unit 2.

Figure 14A:
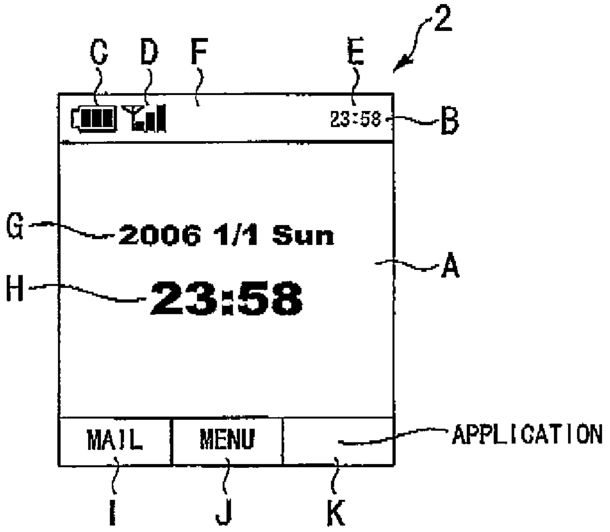
FIG. 14A is a front elevation of a display surface showing an example of a series of luminance control in the other embodiment of the present invention.
Figure 14B:
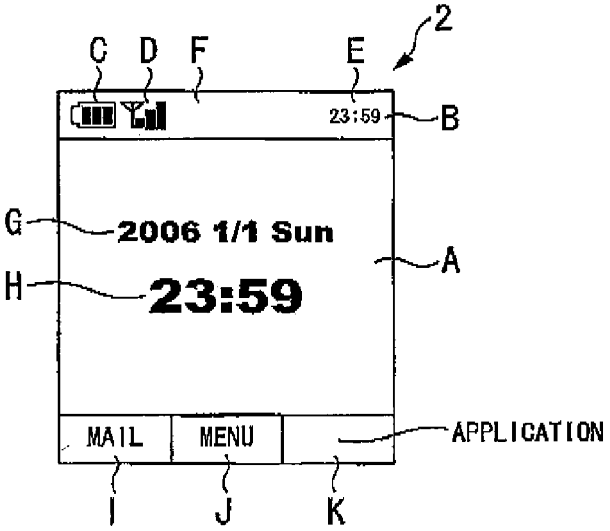
FIG. 14B is a front elevation of the display surface showing an example of the series of luminance control in the other embodiment of the present invention.
Figure 14C:
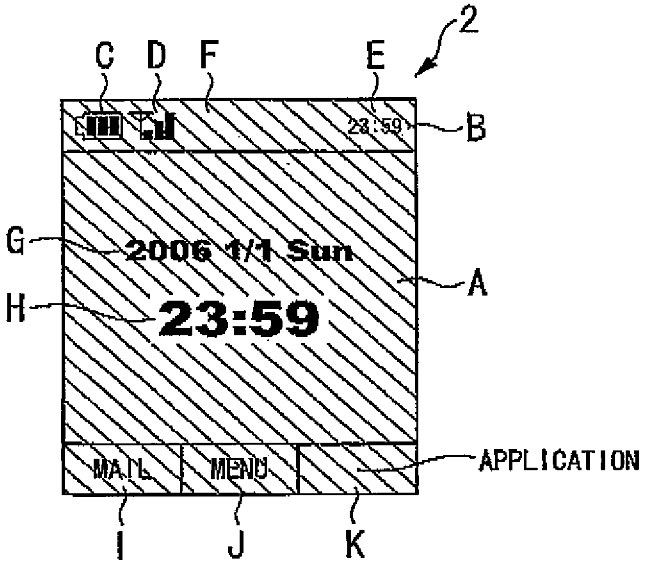
FIG. 14C is a front elevation of the display surface showing an example of the series of luminance control in the other embodiment of the present invention.
Figure 14D:
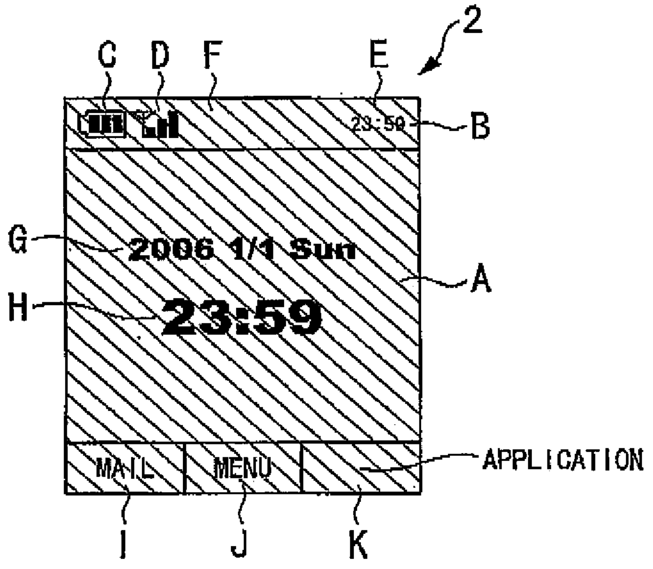
FIG. 14D is a front elevation of the display surface showing an example of the series of luminance control in the other embodiment of the present invention.
Figure 14E:
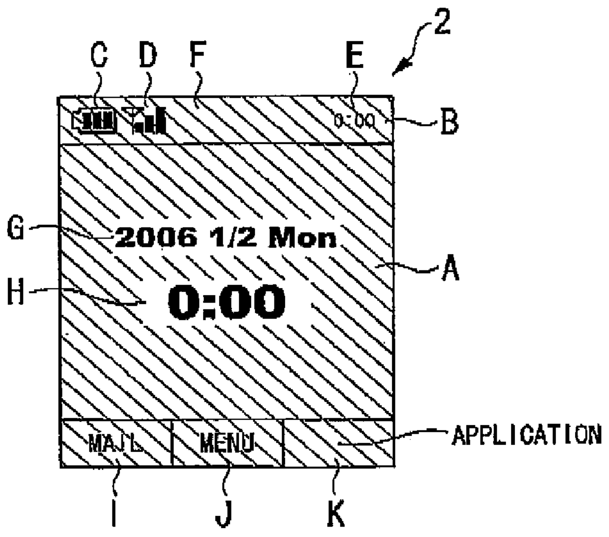
FIG. 14E is a front elevation of the display surface showing an example of the series of luminance control in the other embodiment of the present invention.

FIGS. 14A to 14E are front elevations of the display unit 2, showing an example of a series of luminance control while the waiting application is being executed. At first, the time from the state in FIG. 14A to the state in FIG. 14B and from the state in FIG. 14B to the state in FIG. 14C are both 5 seconds. From FIGS. 14A to 14B, region E and region H for displaying the time has changed. From FIGS. 14B to 14C, 10 seconds have passed without having any change in regions A, B, D, F, G, I, J, and K, the luminance of these regions is reduced, and the luminance of regions C and E dependent on region A is also reduced. With regard to region H, when the state shown in FIG. 14C becomes the state shown in FIG. 14D after 25 seconds, 30 seconds have passed without any change, and hence, the luminance thereof is reduced. When 30 seconds have passed further from FIG. 14D, the state becomes as shown in FIG. 14E in which the date is changed to thereby change regions E, Q and H. At this time, the luminance of regions G and H is restored. However, since region E is dependent on region A, the luminance of region E is not restored.

Figure 15A:
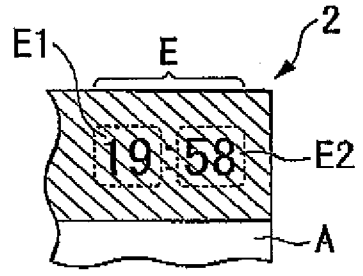
FIG. 15S is a front elevation of a part of the display unit showing an example of the series of luminance control when each function dependent region is subdivided to have a main-and-sub relationship in the other embodiment of the present invention.
FIG. 15B is a front elevation of a part of the display unit showing an example of the series of luminance control when the function dependent region is subdivided to have the main-and-sub relationship in the other embodiment of the present invention.
FIG. 15C is a front elevation of a part of the display unit showing an example of the series of luminance control when the each function dependent region is subdivided to have the main-and-sub relationship in the other embodiment of the present invention.
Figure 15B:
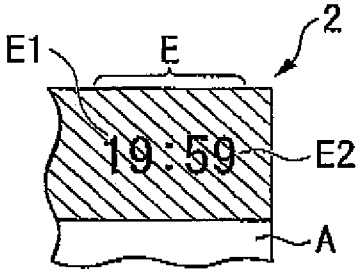
Figure 15C:
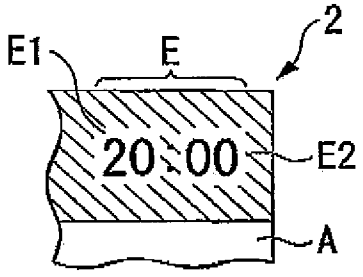

FIGS. 15A to 15C are front elevations of a part of the display unit 2, showing an example of luminance control for region E, which is further subdivided to have a main-and-sub relationship. When the luminance of region A, which is a non-dependent region (main region) of region E is not reduced, if region E1 does not change, although region E2 has changed as with the change from FIG. 15A to FIG. 15B, the luminance of region E is not restored. However, when both the region E1 and region E2 have changed as with the change from FIG. 15B to FIG. 15C, the luminance of region E is restored (lighted).

FIGS. 16A to 16E are front elevations of a part of the display unit 2, showing an example in which the threshold 35 is involved with the restoration of the luminance. In a change of region D, which displays the reception level, from FIG. 16A to FIG. 16B, there is only a small different portion in the images shown in FIG. 16A and FIG. 16B. Therefore, the number of pixels having a different manipulation variable between FIG. 16A and FIG. 16B does not exceed a value specified by the threshold 35, and hence the luminance is not restored. On the other hand, when the region D changes as from FIG. 16A to FIG. 16C, there is a large different portion in the images shown in FIG. 16A and FIG. 16C. Therefore, the number of pixels having a different manipulation variable between FIG. 16A and FIG. 16C exceeds the value specified by the threshold 35, and hence the luminance is restored.

Figure 16A:
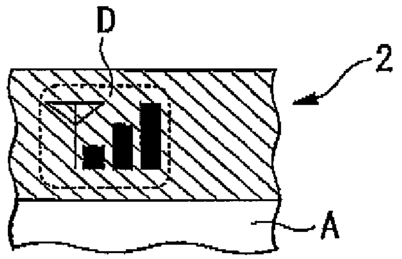
FIG. 16A is a front elevation of a part of the display unit showing an example in which a threshold is involved with restoration of the luminance in the other embodiment of the present invention.
Figure 16B:
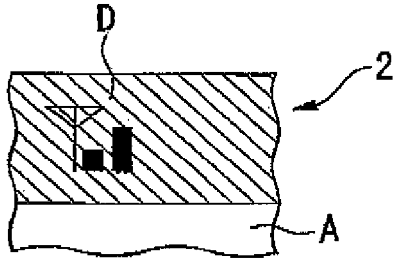
FIG. 16B is a front elevation of a part of the display unit showing an example in which the threshold is involved with restoration of the luminance in the other embodiment of the present invention.
Figure 16C:
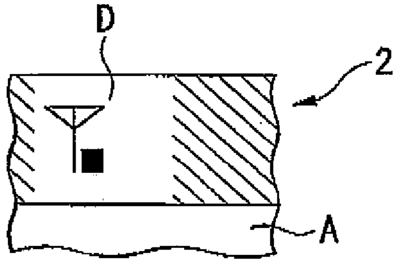
FIG. 16C is a front elevation of a part of the display unit showing an example in which the threshold is involved with restoration of the luminance in the other embodiment of the present invention.
Figure 16D:
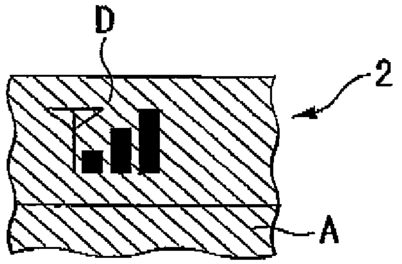
FIG. 16D is a front elevation of a part of the display unit showing an example in which the threshold is involved with restoration of the luminance in the other embodiment of the present invention.
Figure 16E:
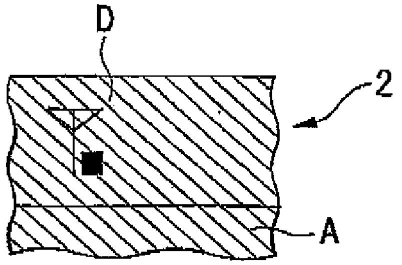
FIG. 16E is a front elevation of a part of the display unit showing an example in which the threshold is involved with restoration of the luminance in the second embodiment of the present invention.

However, in the case of a change from FIG. 16D to FIG. 16E, a degree of change in region D is the same as that of the change from FIG. 16A to FIG. 16C, but the luminance of region A, on which region D is dependent, is in the reduced state. Therefore, even if the number of pixels having a different manipulation variable exceeds the value specified by the threshold 35, the luminance thereof is not restored.

FIGS. 17A to 17D are front elevations of a part of the display unit 2, showing cooperation between an event and the luminance restoration control. When the transmitting and receiving unit 8 receives an email, region F changes the state from FIG. 17A to FIG. 17B, to display an icon indicating that there is an unread message in region F, and the icon continues to be displayed until the message is read. As specified in the event cooperation 36 in FIGS. 10A and 10B, when an email reception event occurs, if the luminance of the pixels in the region has been reduced, the luminance of region F is restored (lighted).

Figure 17A:
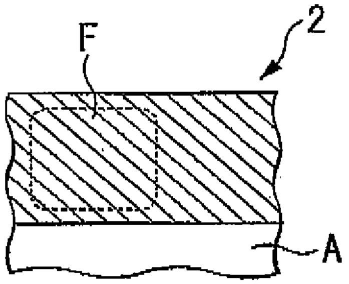
FIG. 17A is a front elevation of a part of the display unit showing an example of cooperation between an event and luminance restoration control in the other embodiment of the present invention.
Figure 17B:
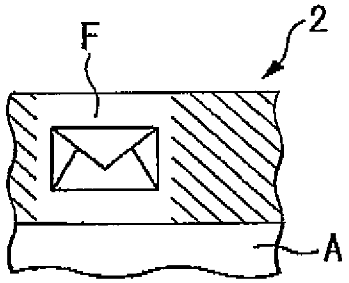
FIG. 17B is a front elevation of a part of the display unit showing an example of the cooperation between an event and the luminance restoration control in the other embodiment of the present invention.
Figure 17C:
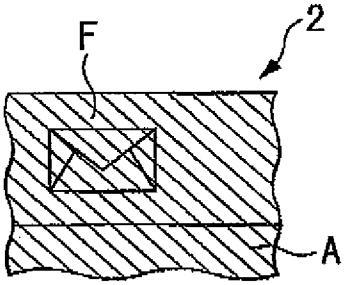
FIG. 17C is a front elevation of a part of the display unit showing an example of the cooperation between the event and the luminance restoration control in the other embodiment of the present invention.
Figure 17D:
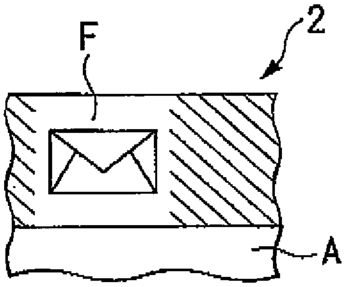
FIG. 17D is a front elevation of a part of the display unit showing an example of the cooperation between the event and the luminance restoration control in the other embodiment of the present invention.

If 10 seconds have passed without the email message being read, region F changes the state from FIG. 17B to FIG. 17C, and the luminance of region F is reduced. When another email is received, region F changes the state from FIG. 17C to FIG. 17D, to restore the luminance of region F. Here between the state shown in FIG. 17C and the state shown in FIG. 17D, there is no different part in the image, however the luminance is restored in cooperation with the event.

Figure 18A:
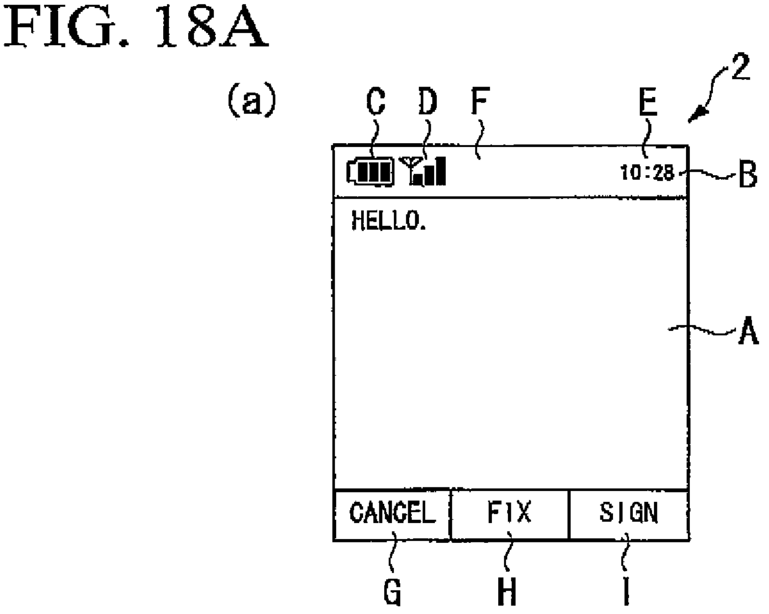
FIG. 18A is a front elevation of the display unit showing another example of a series of luminance control in the other embodiment of the present invention.
Figure 18B:
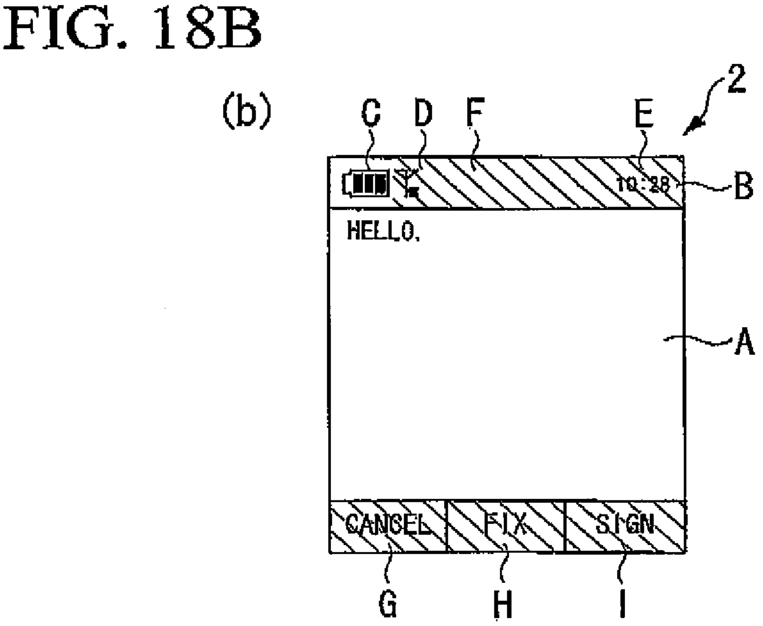
FIG. 18B is a front elevation of the display unit showing the other example of the series of luminance control in the other embodiment of the present invention.

FIGS. 18A to 18H are front elevations of the display unit 2 showing an example of a series of luminance control, while the message creation application is being executed. The time from the state in FIG. 18A to the state in FIG. 18B is 10 seconds. When the state has changed from FIG. 18A to FIG. 18B, 10 seconds have passed without any change in regions B, D, E, F, G, H, and I, and hence the luminance of these regions is reduced.

Figure 18C:
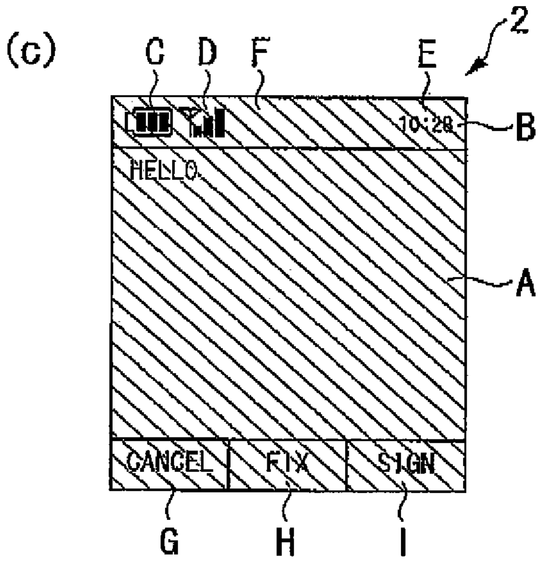
FIG. 18C is a front elevation of the display unit showing the other example of the series of luminance control in the other embodiment of the present invention.

The time from the state in FIG. 18B to the state in FIG. 18C is 20 seconds. When the state has changed from FIG. 18B to FIG. 18C, 30 seconds have passed without any change in regions A and C, and hence the luminance of these regions is reduced.

Figure 18D:
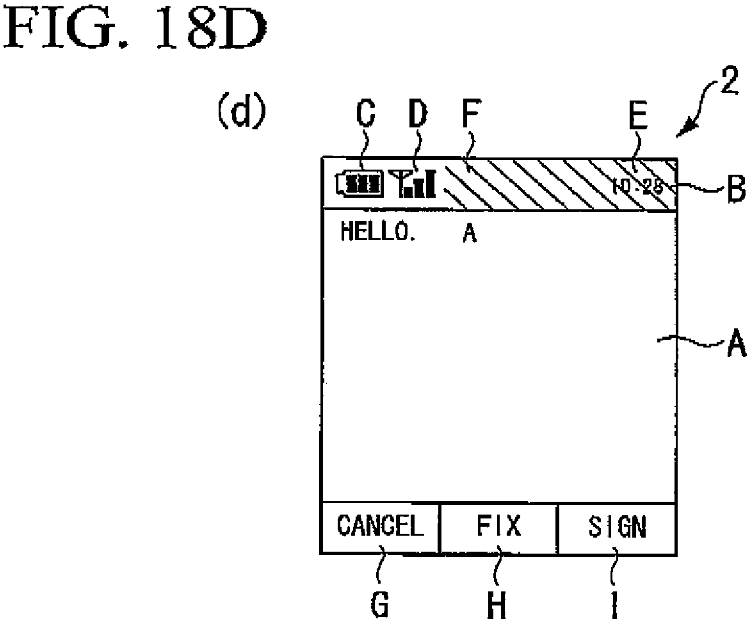
FIG. 18D is a front elevation of the display unit showing the other example of the series of luminance control in the other embodiment of the present invention.

When “A” is input in the state shown in FIG. 18C and the state becomes as shown in FIG. 18D, the luminance of region A is restored, and the luminance of regions C, D, G, H, and I dependent on region A is also restored.

Figure 18E:
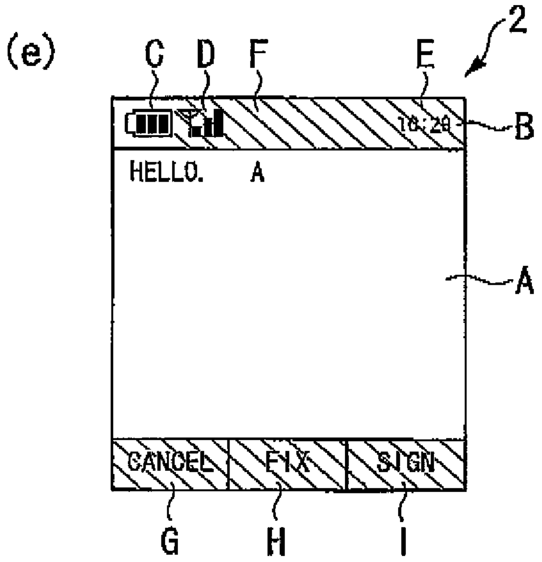
FIG. 18E is a front elevation of the display unit showing the other example of the series of luminance control in the other embodiment of the present invention.

The time from the state in FIG. 18D to a state in FIG. 18E is 10 seconds. When the state has changed from FIG. 18D to FIG. 18E, 10 seconds have passed without any change in regions D, G, H, and I, and hence the luminance of these regions is reduced. Moreover, when the state has changed from FIG. 18D to FIG. 18E, although region E is updated, the number of pixels having a different manipulation variable does not exceed the value specified by the threshold 35, and hence the luminance thereof is not restored.

Figure 18F:
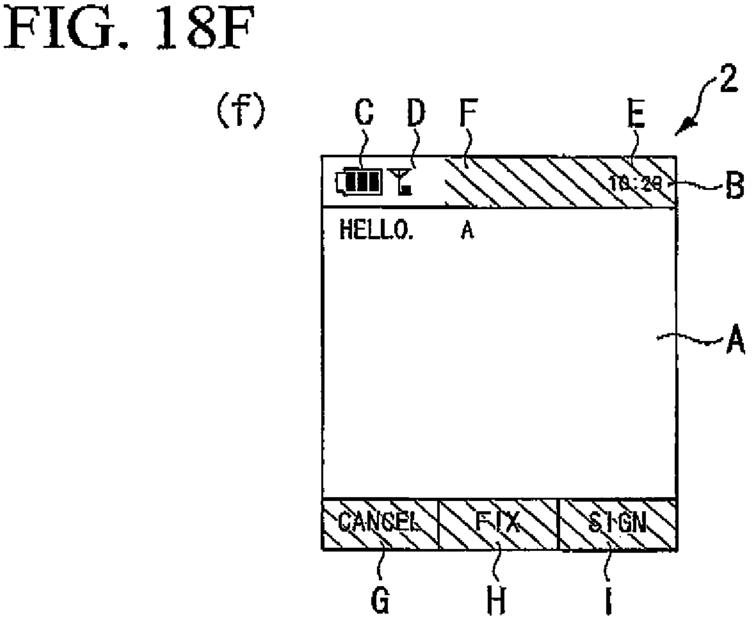
FIG. 18F is a front elevation of the display unit showing the other example of the series of luminance control in the other embodiment of the present invention.

The time from the state in FIG. 18E to the state in FIG. 18F is 10 seconds. In the state shown in FIG. 18F, region D displaying the reception level is updated, and the number of pixels having a different manipulation variable exceeds the value specified by the threshold 35, and hence the luminance thereof is restored.

Figure 18G:
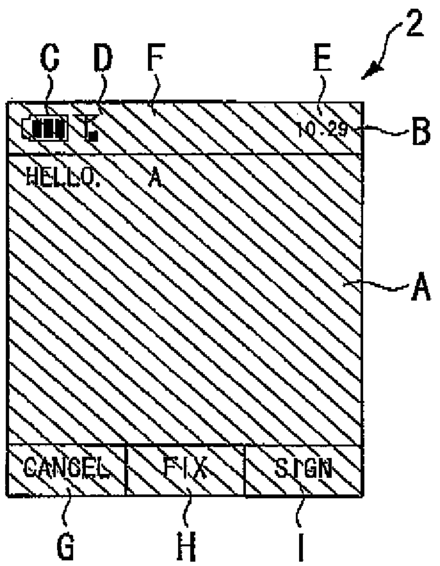
FIG. 18G is a front elevation of the display unit showing the other example of the series of luminance control in the other embodiment of the present invention.
Figure 18H:
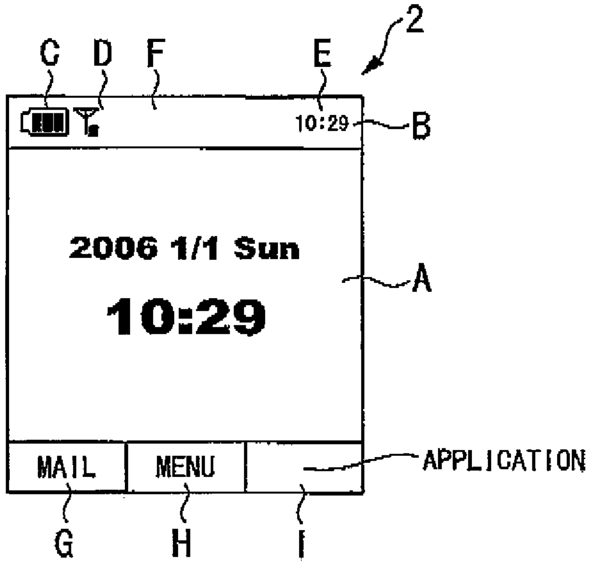
FIG. 18H is a front elevation of the display unit showing the other example of the series of luminance control in the other embodiment of the present invention.

The time from the state in FIG. 18F to the state in FIG. 18G is 10 seconds. The user does not input any character, and 10 seconds have passed without any change in region A, and hence the luminance of region A is reduced, and the luminance of regions C and D dependent on region A is also reduced.

Then when the screen shifts from the state shown in FIG. 18F to a waiting screen shown in FIG. 18G by the operation of the user, the application being executed is changed from the message creation application to the waiting application. Therefore, the function dependent region applied to the display unit 2 is changed, and the counter value allocated to each region is changed to the initial value, and hence the luminance of all regions is restored.

In this second embodiment, the luminance is controlled so as to be reduced by one level, however the level may be two or more at the time of implementation.

Moreover the display apparatus in this embodiment is effective if it is applied to a battery-driven portable terminal device. The portable terminal device includes battery-driven devices, for example, a mobile phone, a PDA, a portable TV, and a notebook PC.

The present invention has been described by way of embodiments, but the present invention is not limited to the above-described embodiments, and various modifications are possible without departing from the spirit and the scope of the present invention.

The invention claimed is:

1. A display apparatus comprising:

a display unit having pixels each of which is formed of a self-luminous element; and a controller configured to divide the display unit into function dependent luminous regions, and to reduce luminance of the pixels in the function dependent luminous regions when the pixels in the function dependent luminous regions have not changed for a predetermined period of time or longer, wherein a main-and-sub relationship between different function dependent luminous regions having non-contiguous boundaries with regard to luminous control is preset such that luminous changes in one function dependent luminous region will affect luminosity in another function dependent luminous region, the controller is configured to simultaneously reduce, based on the main-and-sub relationship, luminance of the function dependent luminous regions to which a sub-part of the main-and-sub relationship is assigned when luminance of the function dependent luminous regions to which a main-part of the main-and-sub relationship is assigned is to be reduced, the function dependent luminous regions are defined by the pixels whose luminance has not changed for the predetermined period of time or longer, and the function dependent luminous regions are determined depending on luminance change of the pixels included therein.

2. The display apparatus according to claim 1, wherein the controller is configured to further reduce the luminance of the pixels in the function dependent luminous regions when the pixels in the function dependent luminous regions with reduced luminance have not changed further for a predetermined period of time or longer.

3. The display apparatus according to claim 1, wherein weighting values according to importance of display content are respectively preset for the function dependent luminous regions, and the controller is configured to reduce the luminance of the pixels in the function dependent luminous regions with low importance display content, based on the weighting values.

4. The display apparatus according to claim 1, wherein the self-luminous element is an organic EL element.

5. A display apparatus comprising:

a display unit having pixels each of which is formed of a self-luminous element; and a controller configured to divide the display unit into function dependent luminous regions, and to reduce luminance of the pixels in the function dependent luminous regions when the pixels in the function dependent luminous regions have not changed for a predetermined period of time or longer, wherein a main-and-sub relationship between different function dependent luminous regions having non-contiguous boundaries with regard to luminous control is preset such that luminous changes in one function dependent luminous region will affect luminosity in another function dependent luminous region, the controller is configured to simultaneously restore, based on the main-and-sub relationship, luminance of the function dependent luminous regions to which a sub-part of the main-and-sub relationship is assigned when luminance of the function dependent luminous regions to which a main-part of the main-and-sub relationship is assigned is to be restored, the function dependent luminous regions are defined by the pixels whose luminance has not changed for the predetermined period of time or longer, and the function dependent luminous regions are determined depending on luminance change of the pixels included therein.

6. The display apparatus according to claim 5, wherein the controller is configured to further reduce the luminance of the pixels in the function dependent luminous regions when the pixels in the function dependent luminous regions with reduced luminance have not changed further for a predetermined period of time or longer.

7. The display apparatus according to claim 5, wherein weighting values according to importance of display content are respectively preset for the function dependent luminous regions, and the controller is configured to reduce the luminance of the pixels in the function dependent luminous regions with low importance display content, based on the weighting values.

8. The display apparatus according to claim 5, wherein the self-luminous element is an organic EL element.

* * * * *